US012695340B2

(12) United States Patent
Hwang et al.

(10) Patent No.: US 12,695,340 B2
(45) Date of Patent: Jul. 28, 2026

(54) MOTOR

(71) Applicant: Samsung Electronics Co., Ltd.,
Suwon-si (KR)

(72) Inventors: Woong Hwang, Suwon-si (KR);
Wonsoo Kang, Suwon-si (KR)

(73) Assignee: SAMSUNG ELECTRONICS CO.,
LTD., Suwon-si (KR)

( * ) Notice: Subject to any disclaimer, the term of this
patent is extended or adjusted under 35
U.S.C. 154(b) by 201 days.

(21) Appl. No.: 18/388,598

(22) Filed: Nov. 10, 2023

(65) Prior Publication Data

US 2024/0171022 A1 May 23, 2024

Related U.S. Application Data

(63) Continuation of application No.
PCT/KR2023/017859, filed on Nov. 8, 2023.

(30) Foreign Application Priority Data

Nov. 17, 2022 (KR) ........................ 10-2022-0154697

(51) Int. Cl.
H02K 1/27 (2022.01)
H02K 1/276 (2022.01)
(52) U.S. Cl.
CPC .................................... H02K 1/276 (2013.01)
(58) Field of Classification Search
CPC ............................. H02K 1/276; H02K 1/2773
See application file for complete search history.

(56) References Cited

U.S. PATENT DOCUMENTS

| | | | |
|---|---|---|---|
| 9,178,394 | B2 | 11/2015 | Asahi et al. |
| 10,027,200 | B2 | 7/2018 | Akashi et al. |
| 10,284,037 | B2 | 5/2019 | Miyajima |
| 11,355,979 | B2 | 6/2022 | Kim et al. |

(Continued)

FOREIGN PATENT DOCUMENTS

| | | |
|---|---|---|
| CN | 111969748 A | 11/2020 |
| CN | 112910132 A | 6/2021 |

(Continued)

OTHER PUBLICATIONS

International Search Report, PCT/ISA/210, dated Feb. 7, 2024, in
PCT Application No. PCT/KR2023/017859.

(Continued)

*Primary Examiner* — Thomas Truong
(74) *Attorney, Agent, or Firm* — STAAS & HALSEY
LLP

(57) ABSTRACT

A motor comprising a stator; and a rotor surrounded in a
circumferential direction of the rotor by the stator, wherein
the rotor includes: a sleeve including an axial hole extending
in a first direction, a plurality of rotor cores spaced apart
from each other around the sleeve in the circumferential
direction of the rotor, a plurality of permanent magnets
respectively arranged, between each two adjacent rotor
cores of the plurality of rotor cores, a plurality of bridges
respectively corresponding to the plurality of rotor cores, a
plurality of holes respectfully corresponding to the plurality
of bridges, and a molding unit disposed between the sleeve
and the plurality of rotor cores, wherein the molding unit
connects the sleeve to the plurality of permanent magnets
and the plurality of rotor cores

15 Claims, 37 Drawing Sheets

(56) References Cited

U.S. PATENT DOCUMENTS

| | | | |
|---|---|---|---|
| 2013/0057103 A1 | 3/2013 | Han et al. | |
| 2015/0155747 A1* | 6/2015 | Han | H02K 1/2773 |
| | | | 310/156.56 |
| 2016/0043620 A1* | 2/2016 | Li | H02K 21/14 |
| | | | 310/156.01 |
| 2016/0329760 A1 | 11/2016 | Major | |
| 2017/0133895 A1 | 5/2017 | Lee et al. | |
| 2019/0131839 A1 | 5/2019 | Jang et al. | |
| 2019/0140502 A1 | 5/2019 | Jung et al. | |

FOREIGN PATENT DOCUMENTS

| | | | | |
|---|---|---|---|---|
| JP | 2001-157394 A | 6/2001 | | |
| JP | 2014-36457 | 2/2014 | | |
| JP | 2015-211623 | 11/2015 | | |
| JP | 6121967 | 4/2017 | | |
| JP | 6135967 | 5/2017 | | |
| JP | 6385712 | 9/2018 | | |
| JP | 2022-117166 | 8/2022 | | |
| JP | 2022-153918 | 10/2022 | | |
| KR | 10-2013-0027417 | 3/2013 | | |
| KR | 10-2013-0077140 | 7/2013 | | |
| KR | 10-1353236 | 1/2014 | | |
| KR | 10-2018-0023528 | 3/2018 | | |
| KR | 10-1970532 | 4/2019 | | |
| KR | 10-2020-0077657 | 7/2020 | | |
| KR | 10-2132900 | 7/2020 | | |
| KR | 10-2022-0041193 A | 3/2022 | | |
| WO | WO-2021056902 A1 * | 4/2021 | | H02K 1/28 |

OTHER PUBLICATIONS

Written Opinion, PCT/ISA/237, dated Feb. 7, 2024, in PCT Application No. PCT/KR2023/017859.
International Search Report and Written Opinion dated Feb. 7, 2024 for International Application No. PCT/KR2023/017859.

* cited by examiner

20

MOTOR

CROSS-REFERENCE TO RELATED APPLICATIONS

This is a continuation application of International Application PCT/KR2023/017859, filed Nov. 8, 2023, which is incorporated herein by reference in its entirety, it being further noted that foreign priority benefit is based upon Korean Patent Application No. 10-2022-0154697, filed Nov. 17, 2022, which is incorporated herein by reference in its entirety.

TECHNICAL FIELD

The disclosure relates to a motor, and more particularly, to a motor improved to reduce magnetic flux leakage.

BACKGROUND ART

A motor is a machine obtaining a rotational force from electrical energy and includes a stator and a rotor. The rotor is configured to interact electromagnetically with the stator and rotates by the force acting between a magnetic field and a current flowing through a coil.

Permanent magnet motors using permanent magnets to generate a magnetic field may be classified into surface mounted permanent magnet motors, interior type permanent magnet motors, and spoke type permanent magnet motors. Because a spoke type permanent magnet motor has a high structural magnetic flux concentration, it may generate high torque and high power and may be miniaturized for the same power. A rotor of the spoke type permanent magnet motor includes permanent magnets arranged radially around a motor shaft, and a support arranged to support the permanent magnets and form a path of a magnetic flux.

In the spoke type permanent magnet motor, a portion of the magnetic flux may leak through the support toward the motor shaft. When the magnetic flux leakage increases, because the amount of permanent magnets used may increase for a motor of the same power, it may be disadvantageous in terms of manufacturing cost and miniaturization of the motor.

DISCLOSURE

Technical Solution

A motor according to an example may include a stator and a rotor surrounded in a circumferential direction of the rotor by the stator.

The rotor may include a sleeve including an axial hole extending in a first direction, a plurality of rotor cores spaced apart from each other around the sleeve in the circumferential direction of the rotor, a plurality of permanent magnets respectively arranged, between each two adjacent rotor cores of the plurality of rotor cores, a plurality of bridges respectively corresponding to the plurality of rotor cores, wherein each bridge of the plurality of bridges is between the sleeve and the corresponding rotor core of the plurality of rotor core, a plurality of holes respectfully corresponding to the plurality of bridges, wherein each hole of the plurality of holes extends through the corresponding bridge of the plurality of bridges so that a connection between a first end portion and a second end portion of the bridge is blocked by the hole, and a molding unit disposed between the sleeve and the plurality of rotor cores, wherein the molding unit connects the sleeve to the plurality of permanent magnets and the plurality of rotor cores.

A motor according to an example may include a stator and a rotor surrounded in a circumferential direction of the rotor by the stator.

The rotor may include a plurality of rotor cores spaced apart in the circumferential direction of the rotor, a plurality of permanent magnets respectively arranged between each two adjacent rotor cores of the plurality of rotor cores, a plurality of bridges between each two adjacent rotor cores of the plurality of rotor cores, a plurality of holes respectively corresponding to the plurality of bridges, wherein each hole of the plurality of holes extends through the corresponding bridge of the plurality of bridges so that a connection between the first end portion and the second end portion of the bridge is blocked by the hole.

MODE FOR INVENTION

Figure 1:
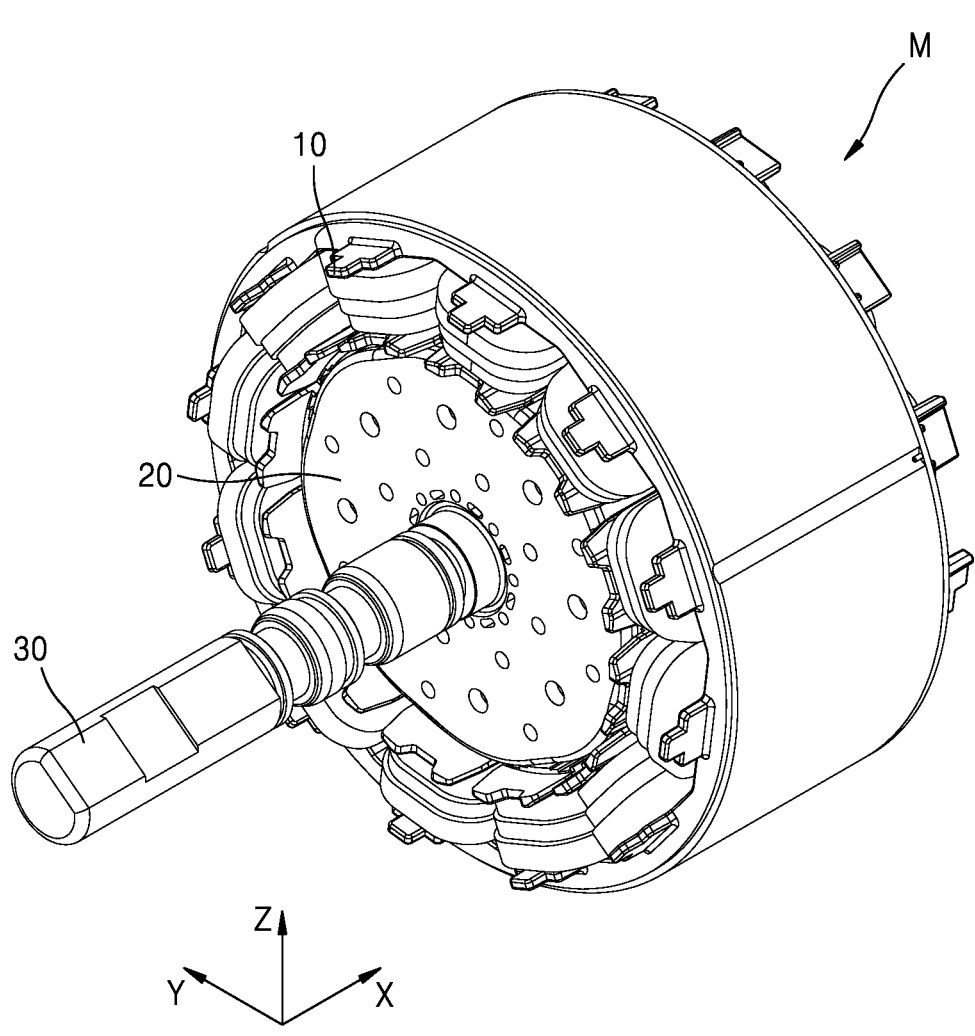
FIG. 1 is a perspective view of a motor according to an example.

Hereinafter, the configuration and operation of the disclosure will be described in detail with reference to embodiments of the accompanying drawings.

Terms used herein will be briefly described and then the disclosure will be described in detail.

The terms used herein are those general terms currently widely used in the art in consideration of functions in the disclosure, but the terms may vary according to the intentions of those of ordinary skill in the art, precedents, or new technology in the art. Also, in some cases, there may be terms that are optionally selected by the applicant, and the meanings thereof will be described in detail in the corresponding portions of the disclosure. Thus, the terms used herein should be understood not as simple names but based on the meanings of the terms and the overall description of the disclosure.

Throughout the disclosure, when something is referred to as "including" an element, one or more other elements may be further included unless otherwise specified.

It will be understood that although terms such as "first" and "second" may be used herein to describe various elements, these elements should not be limited by these terms and these terms are only used to distinguish one element from another element.

Hereinafter, embodiments of the disclosure will be described in detail with reference to the accompanying drawings so that those of ordinary skill in the art may easily implement the disclosure. However, the disclosure may be embodied in many different forms and should not be construed as being limited to the embodiments set forth herein. Also, portions irrelevant to the description of the disclosure will be omitted in the drawings for a clear description of the disclosure, and like reference numerals will denote like elements throughout the specification.

Moreover, terms such as "upper side", "lower side", and "front-back direction" used in the following description are defined based on the drawings, and the shapes and positions of elements are not limited by these terms.

Hereinafter, embodiments of the disclosure will be described in detail with reference to the accompanying drawings.

Figure 2:
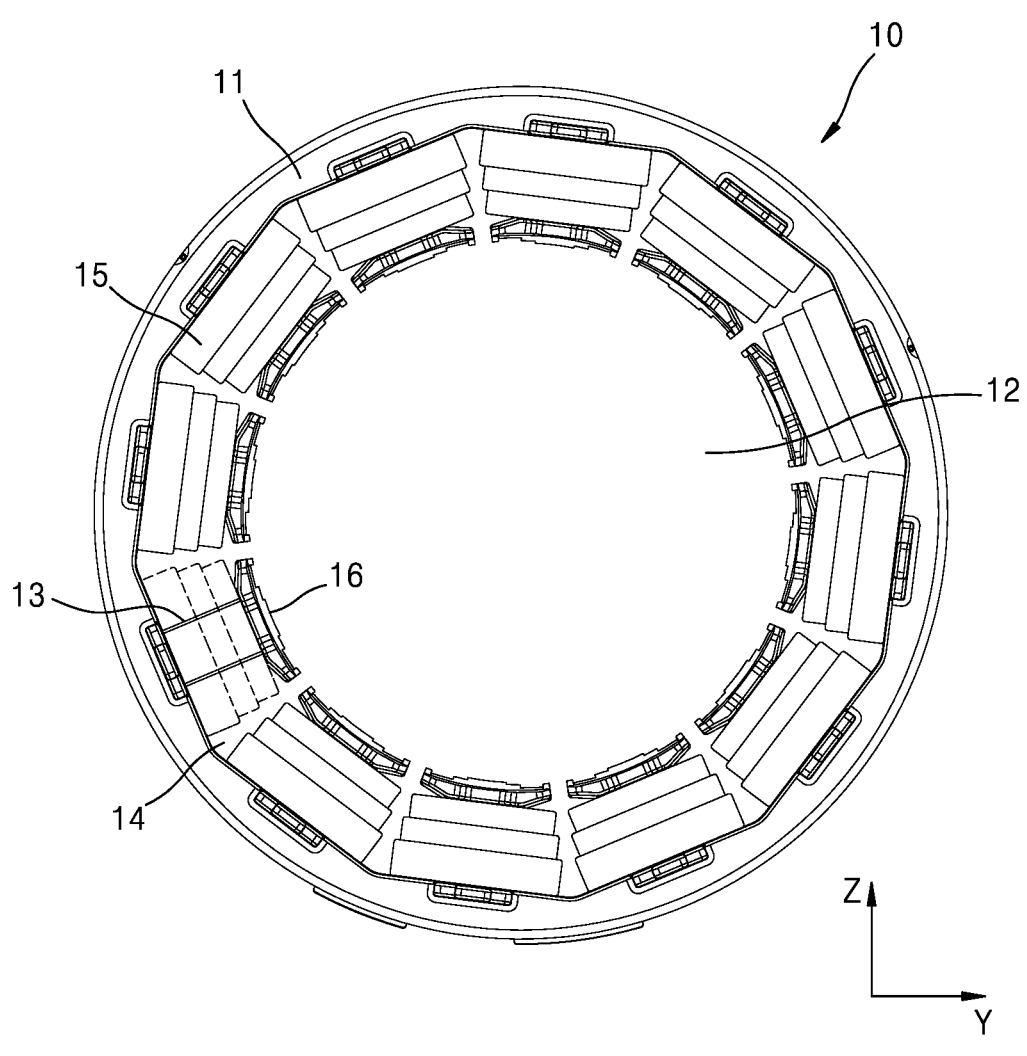
FIG. 2 is a plan view of a stator according to an example.

FIG. 1 is a perspective view of a motor according to an example. FIG. 2 is a plan view of a stator according to an example.

Referring to FIGS. 1 and 2, a motor M according to an example may include a stator 10, a rotor 20, and a motor shaft 30. According to an example, the stator 10 may be fixed to a motor housing (not illustrated), and the rotor 20 may be arranged to rotate by interacting electromagnetically with the stator 10. As an example, the rotor 20 may be arranged to rotate inside the stator 10. The motor shaft 30 may be inserted into the rotor 20 to rotate together with the rotor 20. In the following description, a first direction, for example, an axial direction X, may refer to a direction parallel to the motor shaft 30, and a circumferential direction and a radial direction may refer to a circumferential direction and a radial direction of a circle with the motor shaft 30 as a center thereof.

The stator 10 according to an example may include a stator body 11, a stator core 13, and a coil 15. As an example, the stator body 11 may have an annular rim shape extending in the circumferential direction. A rotor accommodating unit 12 for accommodating the rotor 20 may be formed at a center portion of the stator body 11. A plurality of stator cores 13 may be arranged around the rotor accommodating unit 12 in the circumferential direction. Each of the plurality of stator cores 13 may extend radially from the rotor accommodating unit 12. According to an example, the stator body 11 and the stator core 13 may be integrally formed. For example, the stator body 11 and the stator core 13 may be formed by stacking pressed plates.

The plurality of stator cores 13 may be arranged to be spaced apart from each other by a certain distance in the circumferential direction. A stator slot 14 may be formed between adjacent stator cores 13. As the coil 15 is wound around the stator core 13, the coil 15 may be accommodated in the stator slot 14. An extended core unit 16 in which the width of the stator core 13 is partially extended may be formed at an inner end portion of the stator core 13 adjacent to the rotor 20. The rotor 20 according to an example may be arranged inside the plurality of stator cores 13. In this case, an air gap for rotation of the rotor 20 may be formed between the inner surface of the extended core unit 16 and the outer surface of the rotor 20.

As described above, the rotor 20 may be arranged in the rotor accommodating unit 12 to be rotatable with respect to the stator 10. Hereinafter, the rotor 20 will be described in more detail.

Figure 3:
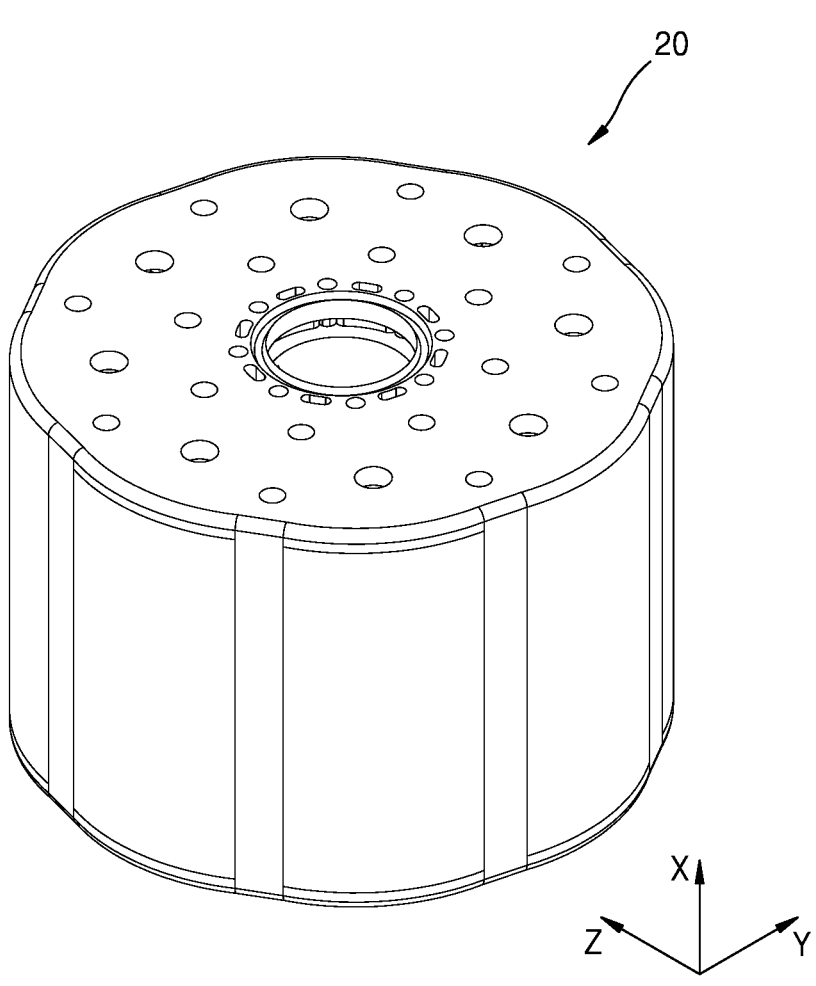
FIG. 3 is a perspective view of a rotor according to an example.
Figure 4:
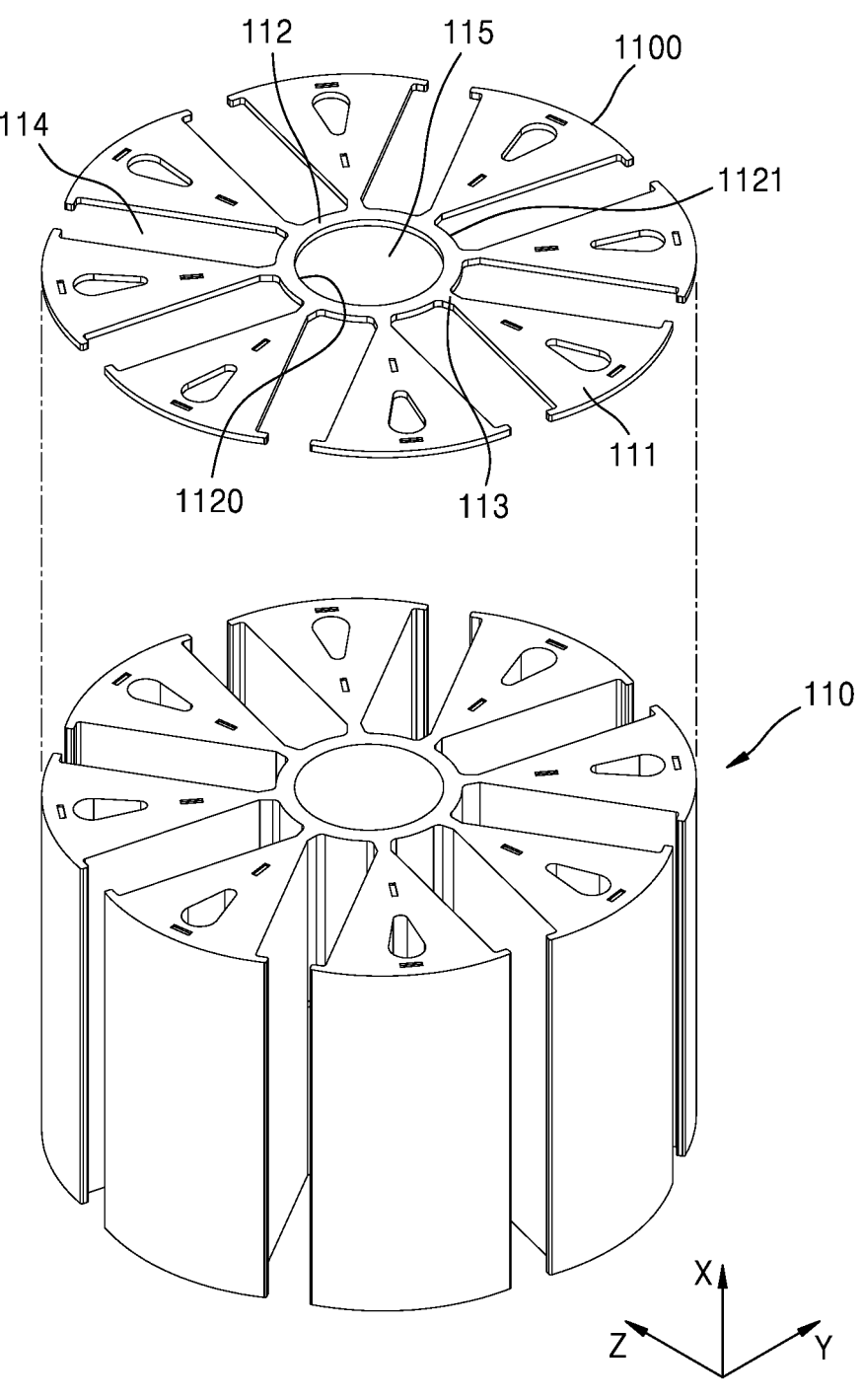
FIG. 4 is a perspective view of a rotor body according to an example.

FIG. 3 is a perspective view of a rotor according to an example. FIG. 4 is a perspective view of a rotor body according to an example.

Referring to FIGS. 3 and 4, a rotor body 110 according to an example may include a plurality of rotor cores 111, a sleeve 112 supporting the motor shaft 30, a plurality of bridges 113 arranged between the plurality of rotor cores 111 and the sleeve 112, and a permanent magnet accommodating unit 114 arranged between the plurality of rotor cores 111.

The plurality of rotor cores 111 may support a plurality of permanent magnets 130 described below and may form a path of a magnetic flux (or a magnetic path) generated from the plurality of permanent magnets 130. The plurality of rotor cores 111 may be arranged in the circumferential direction and may be arranged to be spaced apart from each other to form the permanent magnet accommodating unit 114 for accommodating the plurality of permanent magnets 130.

The sleeve 112 may be formed in an annular shape and may include a shaft hole 115 extending in the first direction X. The motor shaft 30 according to an example may be supported by being inserted into the shaft hole 115. Accordingly, the sleeve 112 may include an inner circumference 1120 contacting the motor shaft 30 inserted into the shaft hole 115 and an outer circumference 1121 facing the permanent magnet 130 inserted in the rotor body 110.

The plurality of bridges 113 may be arranged between the plurality of rotor cores 111 and the sleeve 112 to connect the sleeve 112 with each of the plurality of rotor cores 111. Each of the plurality of bridges 113 according to an example may be arranged in the circumferential direction to correspond to each of the plurality of rotor cores 111. Each of the plurality of bridges 113 may extend radially outward from the outer circumference 1121 of the sleeve 112 and may be connected to an inner end portion of the rotor core 111 corresponding thereto.

According to an example, the plurality of rotor cores 111, the sleeve 112, and the plurality of bridges 113 may be integrally formed of the same material to implement the rotor body 110. As an example, the rotor body 110 may be formed by stacking a body plate 1100 in multiple layers. In this case, the body plate 1100 may include a planar rotor core 111, a sleeve 112, and a plurality of bridges 113.

The body plate 1100 according to an example may be formed from a planar base substrate (not illustrated) through a press punching process. For example, through a press punching process, the body plate 1100 may be processed into a ring shape integrally including the shapes of the rotor core 111, the sleeve 112, and the plurality of bridges 113. The rotor body 110 may be formed by stacking a plurality of body plates 1100 in multiple layers. However, the disclosure is not limited thereto, and the rotor body 110 may be formed in any mode including the plurality of rotor cores 111, the sleeve 112, and the plurality of bridges 113.

Figure 5A:
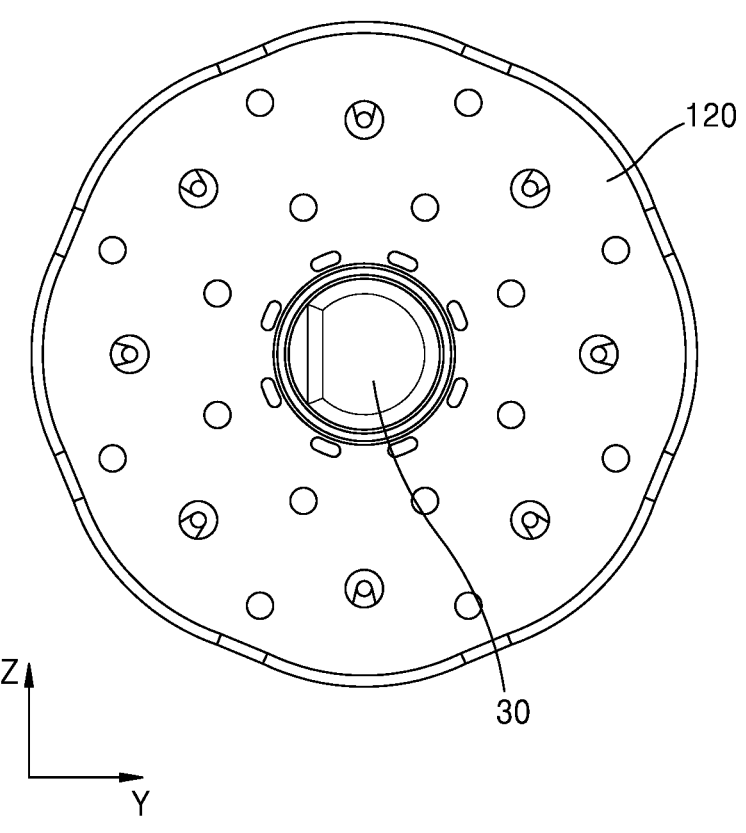
FIG. 5A is a plan view of a rotor before a hole is formed, according to an example.
Figure 5B:
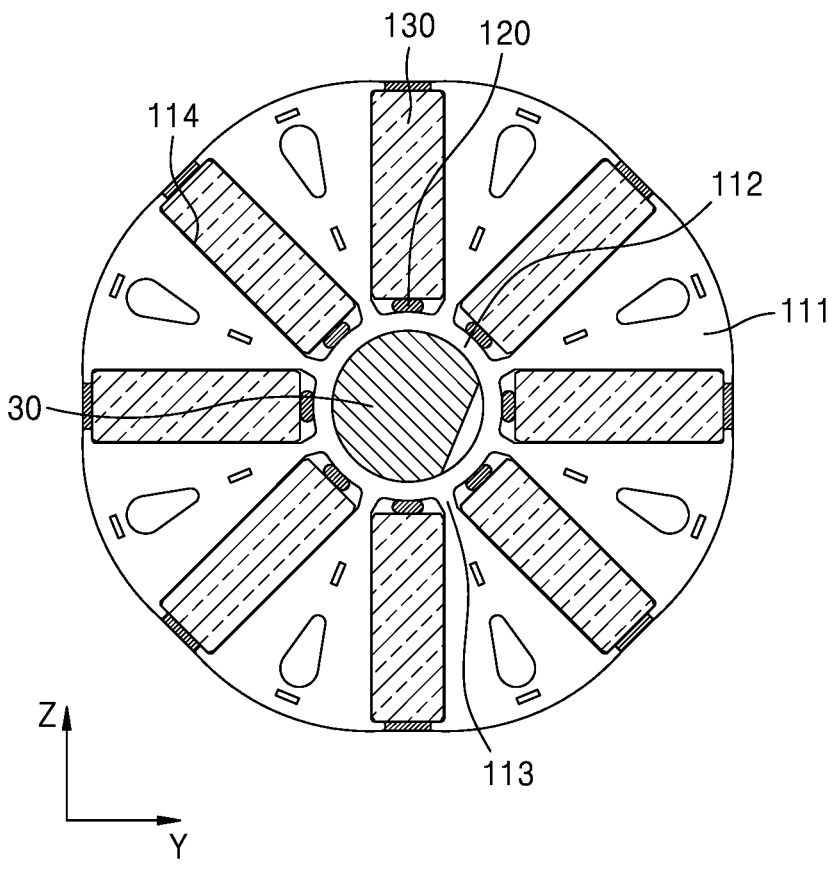
FIG. 5B is a cross-sectional view of the rotor illustrated in FIG. 5A.

FIG. 5A is a plan view of a rotor before a hole is formed, according to an example. FIG. 5B is a cross-sectional view of the rotor illustrated in FIG. 5A.

Referring to FIGS. 5A and 5B, the plurality of permanent magnets 130 according to an example may be arranged in the circumferential direction of the rotor 20 so as to be radially located around the motor shaft 30. As an example, the plurality of permanent magnets 130 may be arranged inside the rotor body 110. For example, the plurality of permanent magnets 130 may be separately arranged between the rotor cores 111 arranged adjacent to each other. In other words, the plurality of permanent magnets 130 may be separately arranged in the permanent magnet accommodating unit 114 formed between the plurality of rotor cores 111 arranged adjacent to each other.

The plurality of permanent magnets 130 according to an example may be arranged apart from the sleeve 112 by using the bridges 113. By arranging the plurality of permanent magnets 130 apart from the sleeve 112, an internal space may be formed between the plurality of permanent magnets 130 and the sleeve 112. Due to the internal space, the leakage of the magnetic flux of the plurality of permanent magnets 130 through the sleeve 112 toward the motor shaft 30 may be effectively suppressed.

FIG. 5B illustrates an example in which eight permanent magnets 130 are arranged; however, the number of permanent magnets 130 may be modified. The permanent magnet 130 according to an example may be a ferrite magnet or a magnet including rare earth elements such as neodymium or samarium; however, the disclosure is not limited thereto.

A molding unit 120 may be arranged to cover the plurality of rotor cores 111, the area between the plurality of rotor cores 111 and the sleeve 112, and the plurality of permanent magnets 130 arranged in the permanent magnet accommodating unit 114. According to an example, the molding unit 120 may include an insulating material. Also, through an injection molding process, the molding unit 120 may be arranged to cover the plurality of rotor cores 111, the area between the plurality of rotor cores 111 and the sleeve 112, and the plurality of permanent magnets 130.

As an example, the molding unit 120 may be arranged to surround the plurality of rotor cores 111 and the plurality of permanent magnets 130 arranged in the permanent magnet accommodating unit 114, to prevent the plurality of permanent magnets 130 from being separated from the plurality of rotor core 111. Also, the molding unit 120 may prevent the plurality of permanent magnets 130 from being damaged due to an external condition.

Also, as an example, the molding unit 120 may be arranged between the plurality of rotor cores 111 and the sleeve 112 to connect the plurality of rotor cores 111 with the sleeve 112. Accordingly, even when the bridge 113 is cut by a plurality of holes 140 described below, the plurality of rotor cores 111 and the sleeve 112 may rotate together around the first direction X.

Figure 6:
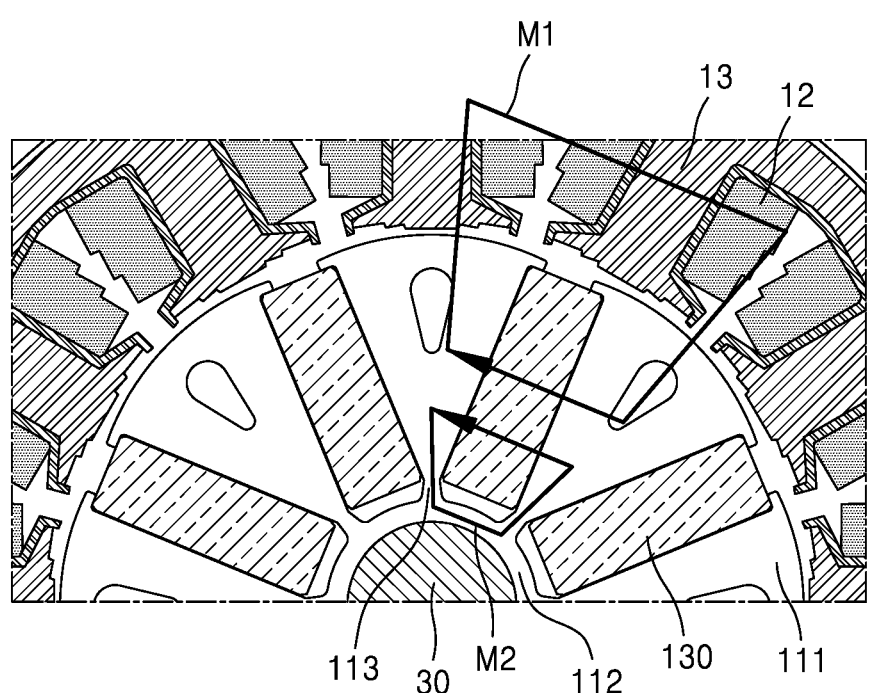
FIG. 6 is a schematic diagram of a rotor and a stator according to a comparative example.

FIG. 6 is a schematic diagram of a rotor and a stator according to a comparative example.

Referring to FIG. 6, the plurality of rotor cores 111 according to a comparative example may support the plurality of permanent magnets 130 and may form a path M1 of a magnetic flux (or a magnetic path) generated from the plurality of permanent magnets 130. In this case, the plurality of rotor cores 111 may be arranged in the circumferential direction and may be arranged to be spaced apart from each other to form the permanent magnet accommodating unit 114 for accommodating the plurality of permanent magnets 130.

The plurality of permanent magnets 130 may be arranged apart from the sleeve 112 by using the bridges 113. By arranging the plurality of permanent magnets 130 apart from the sleeve 112, an internal space may be formed between the plurality of permanent magnets 130 and the sleeve 112. Due to the internal space, the leakage of the magnetic flux of the plurality of permanent magnets 130 through the sleeve 112 toward the motor shaft 30 may be effectively suppressed.

However, the magnetic flux of the plurality of permanent magnets 130 may leak toward the motor shaft 30 through the sleeve 112 through the bridge 113. For example, the plurality of rotor cores 111, the sleeve 112, and the bridge 113 may form a path M2 of a leakage magnetic flux (or a leakage magnetic path) generated from the plurality of permanent magnets 130. When a leakage magnetic flux is generated, because the usage of permanent magnets may increase for the motor of the same power, it may be disadvantageous in terms of manufacturing cost and miniaturization of the motor. Thus, an unnecessary leakage magnetic flux that may be generated from the plurality of permanent magnets 130 should be prevented.

Figure 7A:
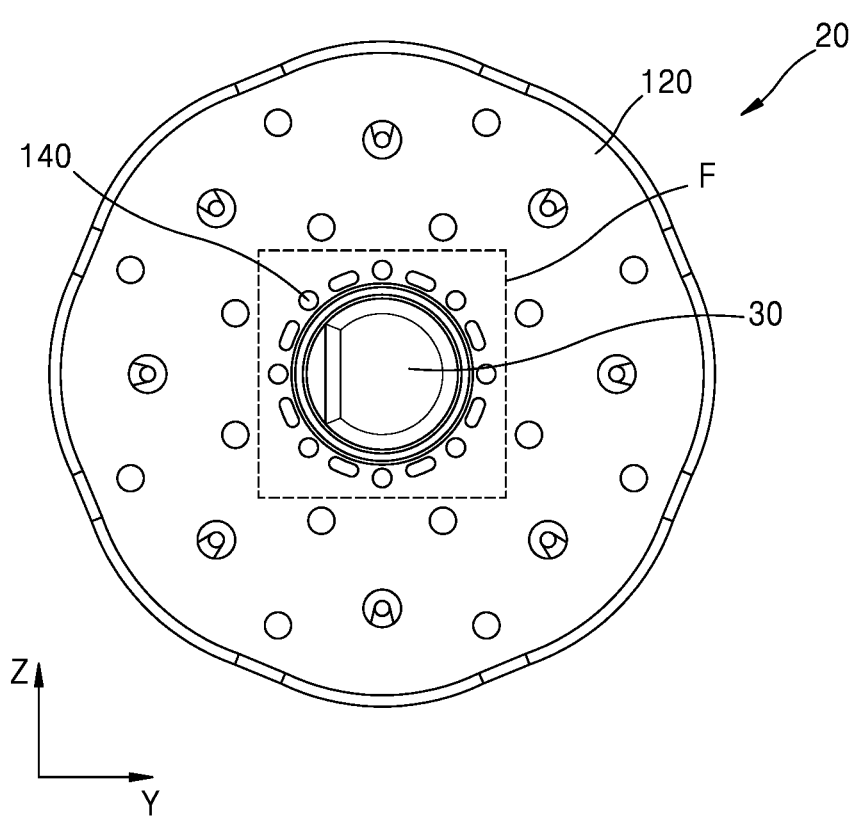
FIG. 7A is a plan view of a rotor according to an example.
Figure 7B:
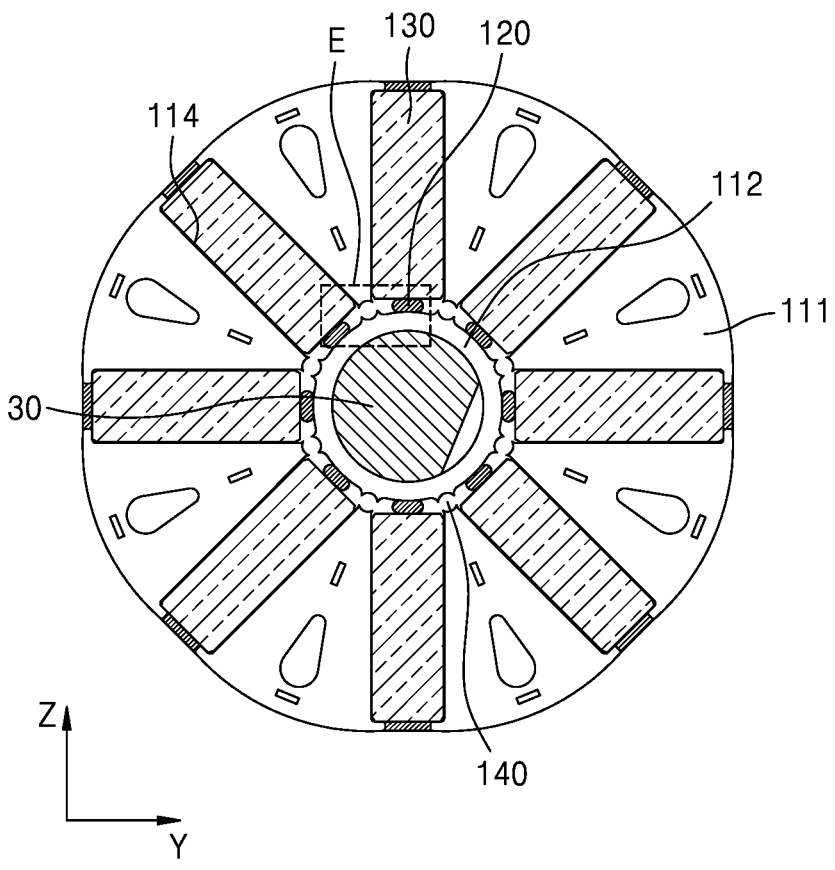
FIG. 7B is a cross-sectional view of the rotor illustrated in FIG. 7A.
Figure 7C:
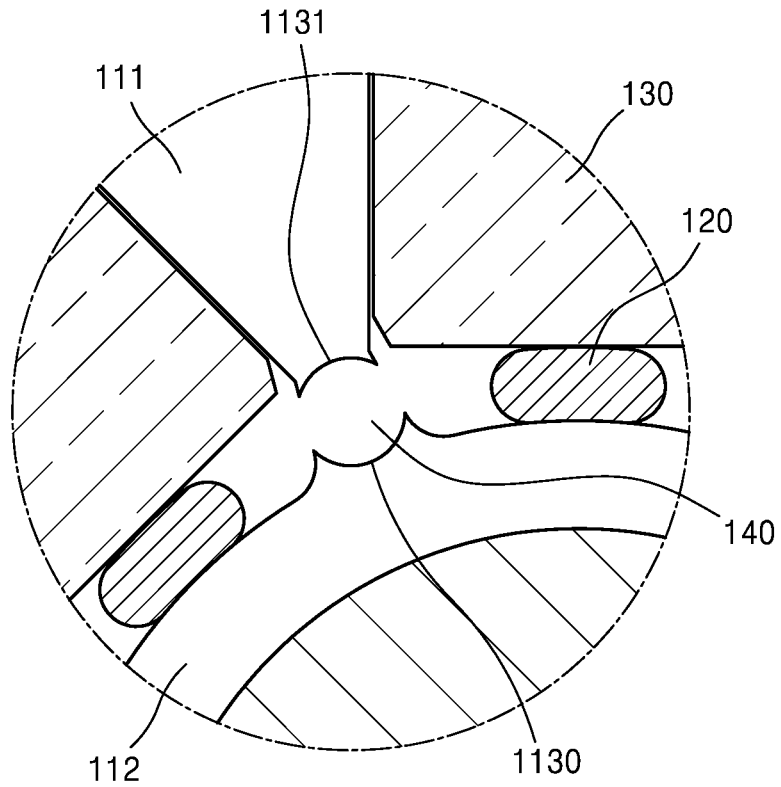
FIG. 7C is an enlarged view of region E of the cross-sectional view illustrated in FIG. 7B.

FIG. 7A is a plan view of a rotor according to an example. FIG. 7B is a cross-sectional view of the rotor illustrated in FIG. 7A. FIG. 7C is an enlarged view of region E of the cross-sectional view illustrated in FIG. 7B.

As illustrated in FIG. 4, the rotor body 110 according to an example may be formed by stacking a body plate 1100 in multiple layers in the first direction X. In this case, the body plate 1100 may include a planar rotor core 111, a sleeve 112, and a plurality of bridges 113. Accordingly, the rotor core 111, the sleeve 112, and the plurality of bridges 113 included in the body plate 1100 may extend to have a certain thickness in the first direction X.

As described above, the path M2 of the leakage magnetic flux generated from the plurality of permanent magnets 130 may be transmitted to the motor shaft 30 through the plurality of rotor cores 111, the sleeve 112, and the bridge 113. When the flow of the path M2 of the leakage magnetic flux through the plurality of rotor cores 111, the sleeve 112, and the bridge 113 is blocked, the flow of an unnecessary leakage magnetic flux may be blocked.

Referring to FIGS. 7A and 7C, a plurality of holes 140 according to an example may be respectively arranged in the plurality of bridges 113. As an example, each of the plurality of holes 140 may be arranged between a first end portion 1130 and a second end portion 1131 of the bridge 113. In this case, each of the plurality of holes 140 may extend in the first direction X. Accordingly, the connection between the first end portion 1130 and the second end portion 1131 of the bridge 113 may be blocked by each of the plurality of holes 140 in the first direction X. Accordingly, the path M2 of the leakage magnetic flux connected through the plurality of rotor cores 111, the sleeve 112, and the bridge 113 may be blocked.

As described above, in order to block the path M2 of the leakage magnetic flux, the plurality of holes 140 may cut the plurality of bridges 113. When the plurality of holes 140 cut the plurality of bridges 113, the connection between the sleeve 112 and the plurality of rotor cores 111 may be blocked. According to an example, the molding unit 120 may be arranged between the plurality of permanent magnets 130 and the sleeve 112. In this case, the molding unit 120 may connect the plurality of permanent magnets 130 and the sleeve 112 to each other. Accordingly, even when the plurality of bridges 113 are cut by the plurality of holes 140, the plurality of permanent magnets 130 and the sleeve 112 may be connected to each other such that power may be transmitted.

Figure 8:
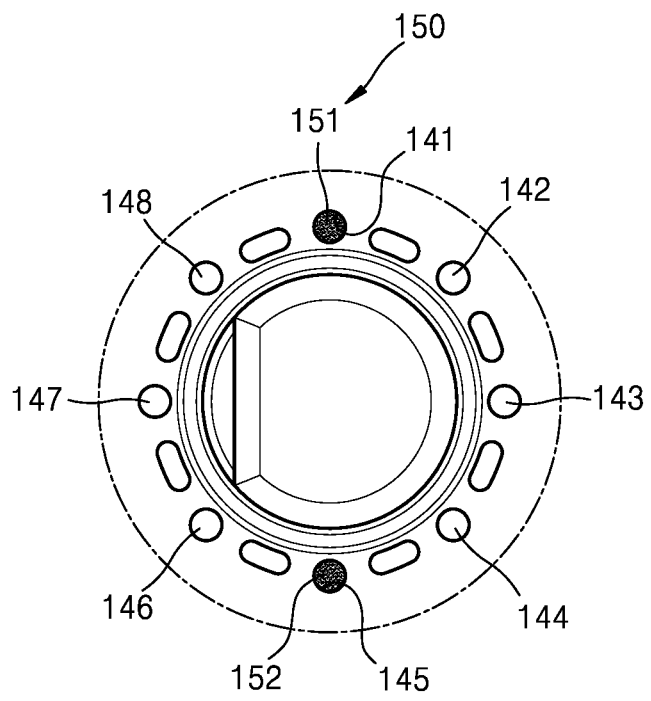
FIG. 8 is an enlarged view of region F of the cross-sectional view illustrated in FIG. 7A.
Figure 9:
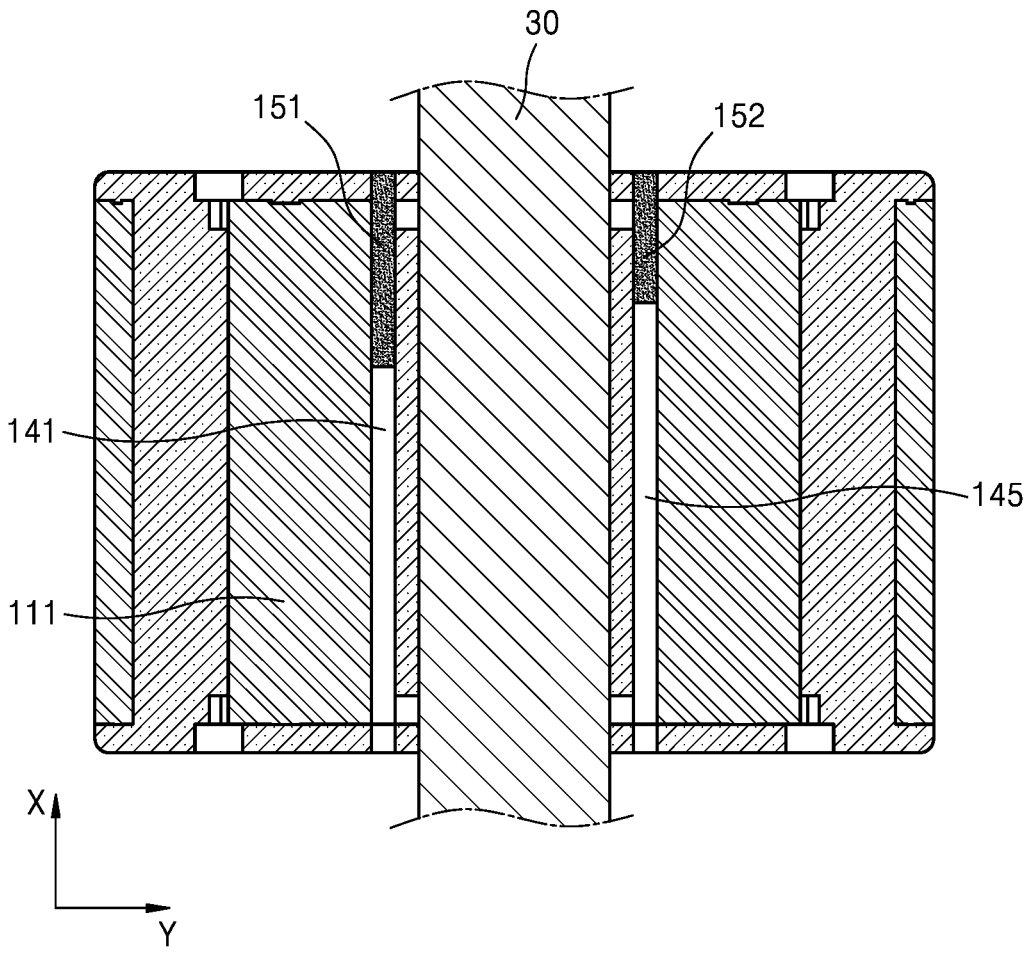
FIG. 9 is a cross-sectional view of a rotor according to an example.

FIG. 8 is an enlarged view of region F of the cross-sectional view illustrated in FIG. 7A. FIG. 9 is a cross-sectional view of a rotor according to an example.

Referring to FIG. 7A, the rotor 20 according to an example may rotate around the first direction X. In this case, a vibration may occur during the rotation of the rotor 20 depending on the shape of the rotor 20 and the mass difference between separate areas of the rotor 20. In order to prevent a vibration from occurring in the rotor 20, an additional mass may be arranged in a separate area of the rotor 20.

Referring to FIGS. 8 and 9, one or more balance members 150 according to an example may be arranged in one or more of the plurality of holes 140. As an example, one or more balance members 150 may extend in the first direction X. For example, one or more balance members 150 may be implemented in plurality. In this case, two or more of a plurality of balance members 150 may have lengths equal to or different from each other in the first direction.

Also, one or more balance members 150 according to an example may have a diameter less than the diameter of the plurality of holes 140. Accordingly, one or more balance members 150 may be arranged to be inserted into the plurality of holes 140.

Also, one or more balance members 150 according to an example may include an insulating material. Accordingly, an unnecessary leakage magnetic flux may be prevented from being transmitted through one or more balance members 150.

The length and arrangement position of one or more balance members 150 according to an example may be determined differently depending on the vibration situations of the rotor 20. As an example, the plurality of holes 140 may be implemented as eight holes 140. For example, the plurality of holes 140 may include first to eighth holes 141 to 148 in the circumferential direction of the motor shaft 30. In this case, when the vibration of the rotor 20 is sensed, a first balance member 151 may be arranged in the first hole 141. Also, a second balance member 152 may be arranged in the fifth hole 145. In this case, the vibration levels of an area where the first hole 141 is arranged and an area where the fifth hole 145 is arranged may be different from each other. Depending on the vibration levels of the area where the first hole 141 is arranged and the area where the fifth hole 145 is arranged, the lengths of the first balance member 151 and the second balance member 152 in the first direction X may be adjusted differently as illustrated in FIG. 9. However, the disclosure is not limited thereto, and the number of holes 140, the number and arrangement position of one or more balance members 150, and the length of one or more balance members 150 may be adjusted differently depending on the vibration situations of the rotor 20.

Figure 10:
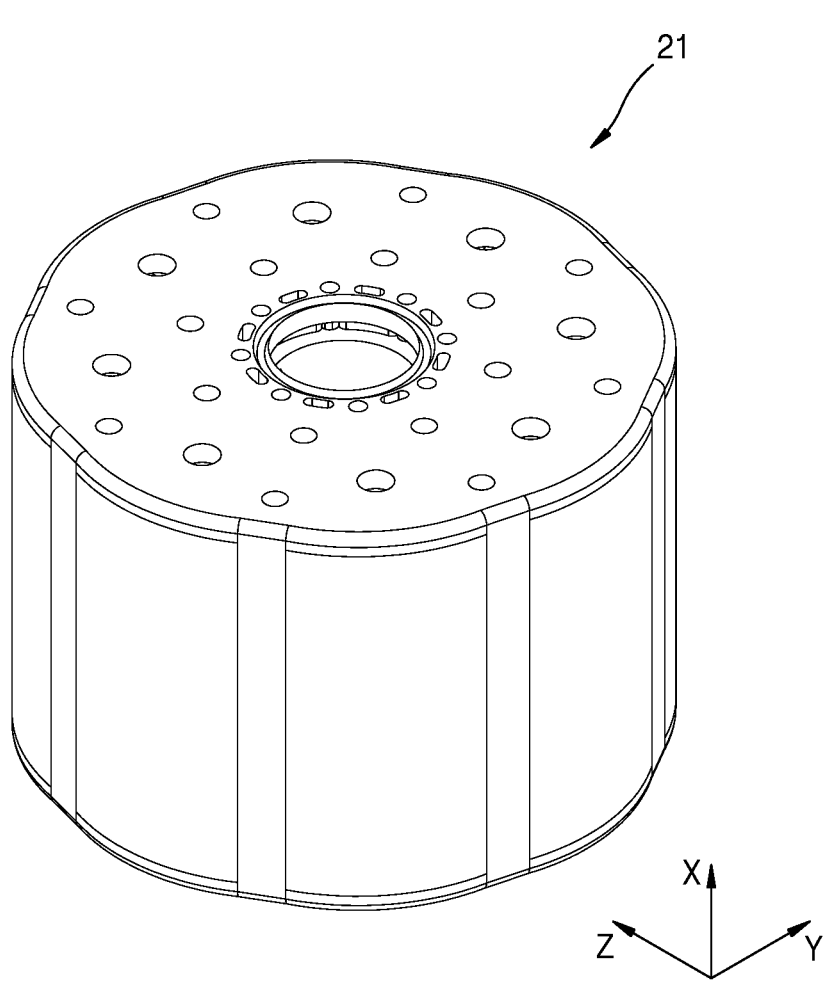
FIG. 10 is a perspective view of a rotor according to an example.
Figure 11:
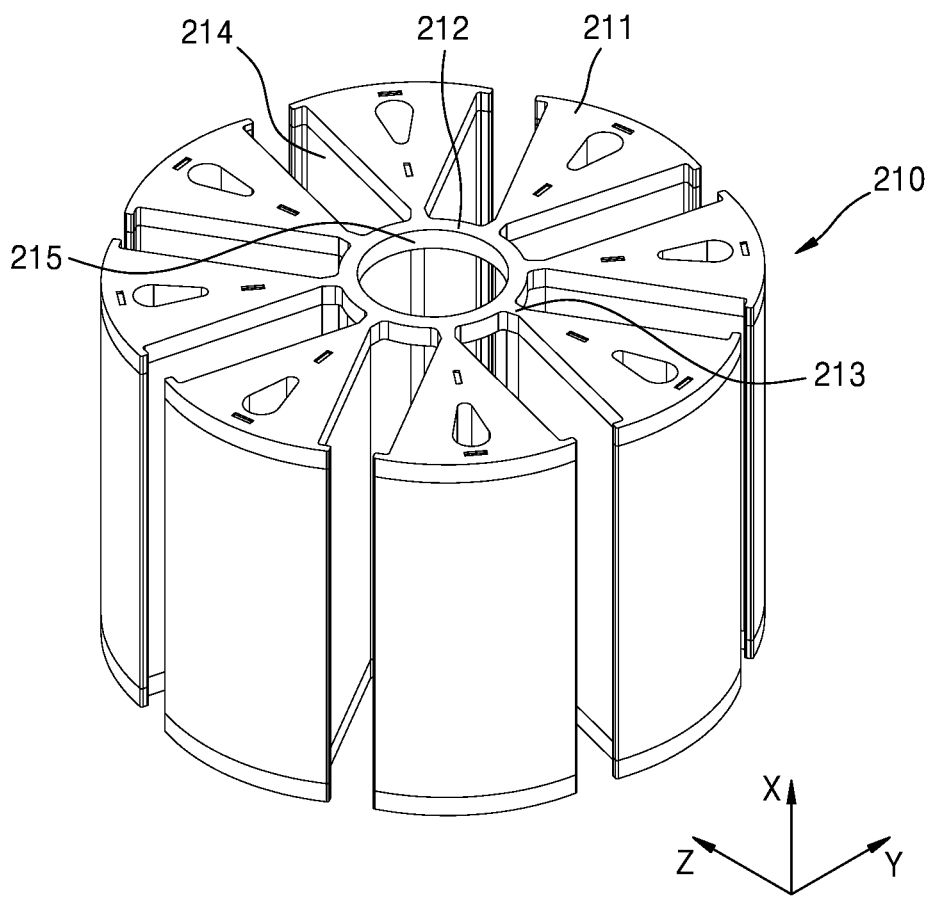
FIG. 11 is a perspective view of a rotor body according to an example.
Figure 12:
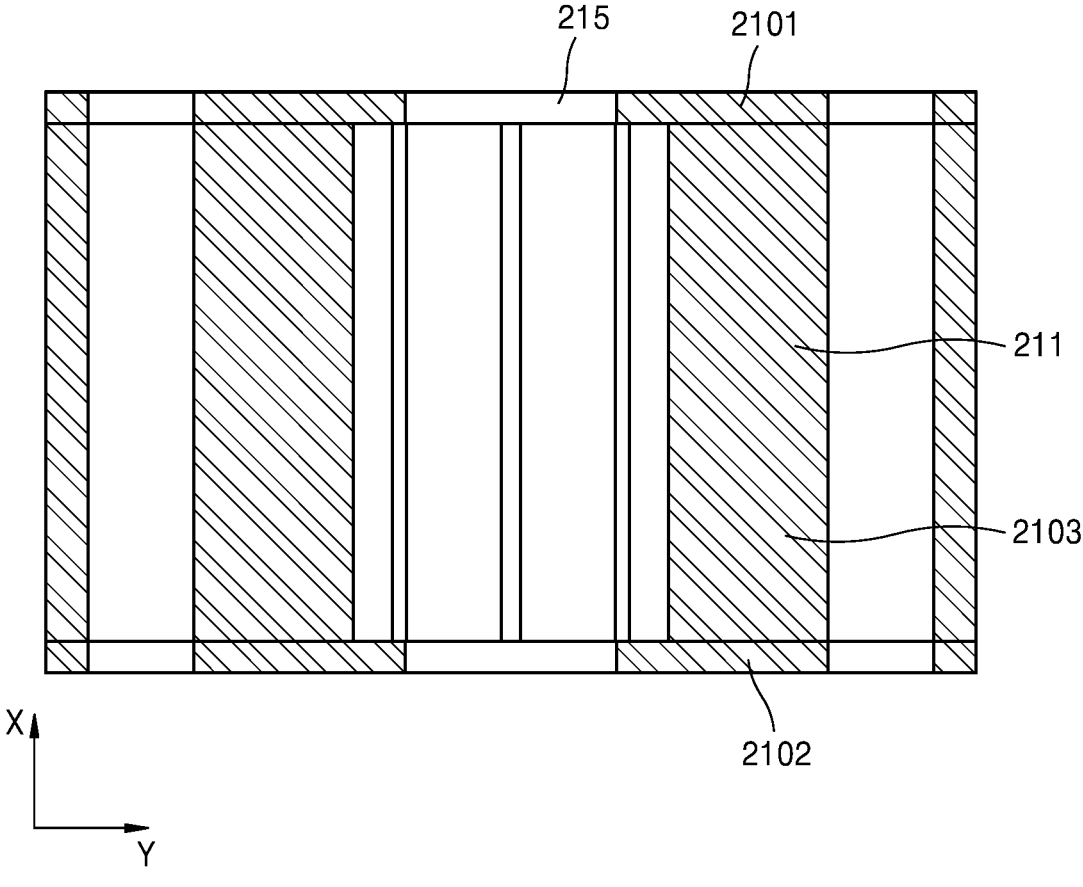
FIG. 12 is a cross-sectional view of the rotor body illustrated in FIG. 11.
Figure 13A:
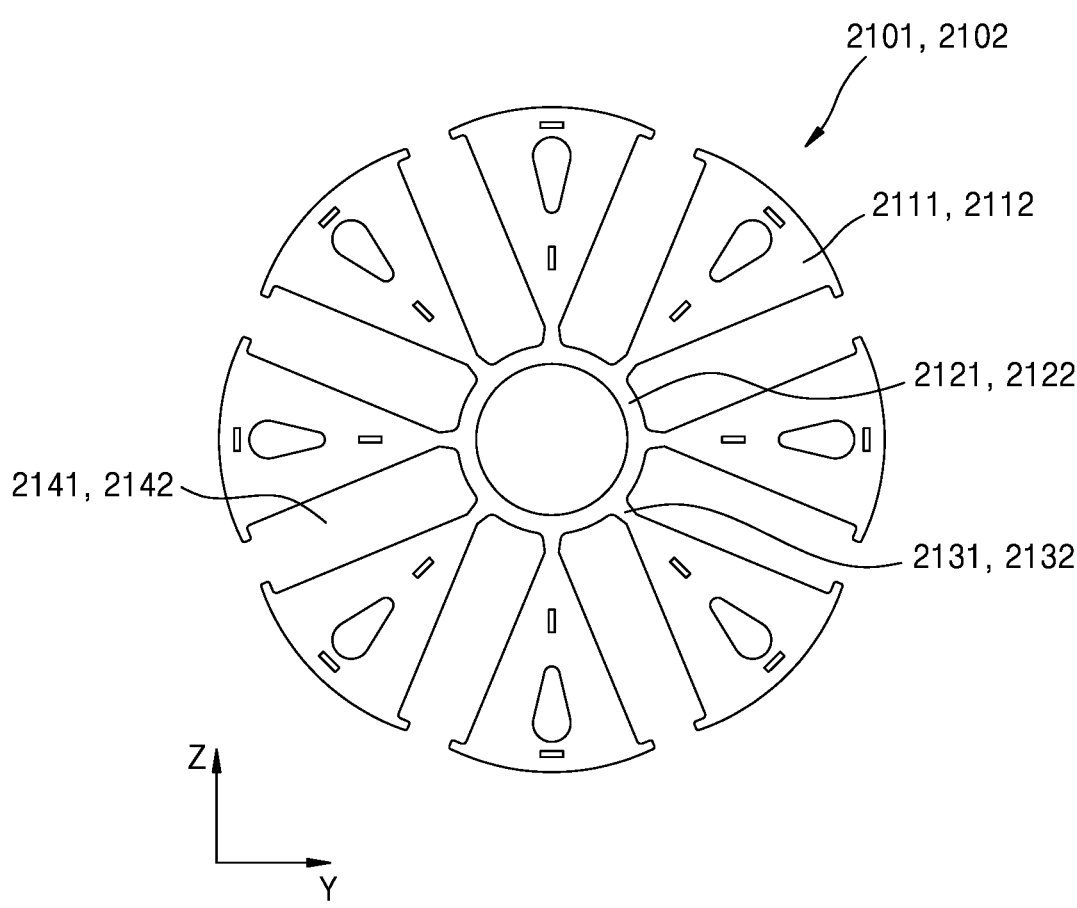
FIG. 13A is a plan view of a first body plate according to an example.
Figure 13B:
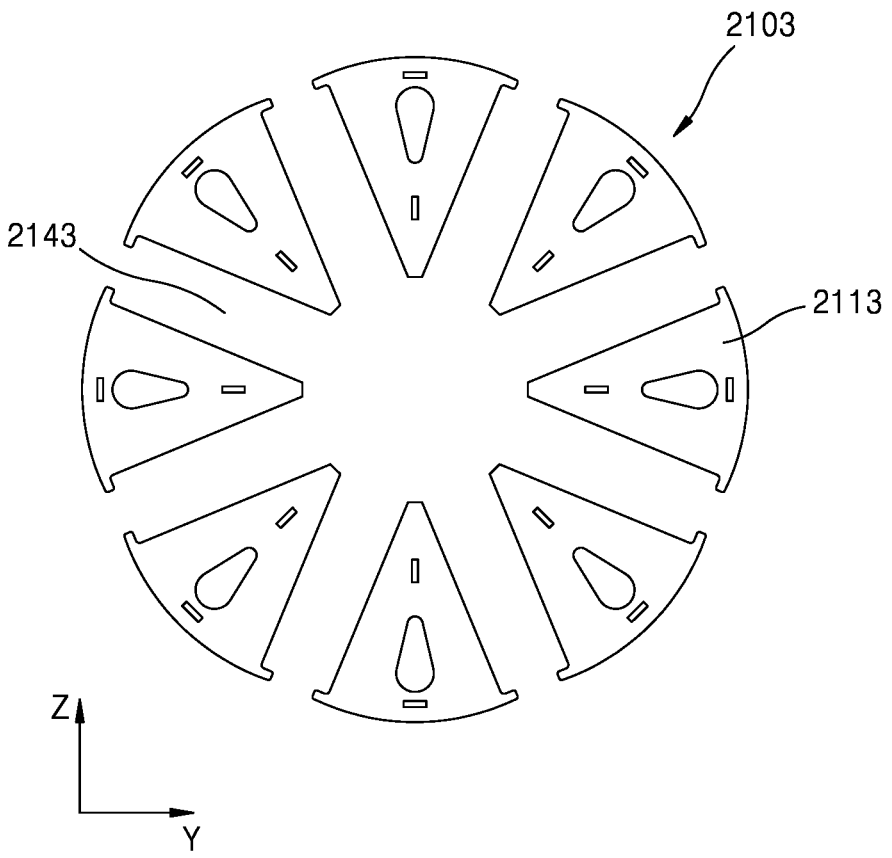
FIG. 13B is a plan view of a second body plate according to an example.

FIG. 10 is a perspective view of a rotor according to an example. FIG. 11 is a perspective view of a rotor body according to an example. FIG. 12 is a cross-sectional view of the rotor body illustrated in FIG. 11. FIG. 13A is a plan view of a first body plate according to an example. FIG. 13B is a plan view of a second body plate according to an example.

Referring to FIGS. 1 and 10 to 12, the motor M according to an example may include a stator 10, a rotor 21, and a motor shaft 30. The rotor 21 may be arranged in the rotor accommodating unit 12 to be rotatable with respect to the stator 10. Because the configurations of the stator 10 and the motor shaft 30, excluding the rotor 21, are the same as those illustrated in FIG. 1, redundant descriptions thereof will be omitted for conciseness.

A rotor body 210 according to an example may include a plurality of rotor cores 211, a sleeve 212 supporting the motor shaft 30, a plurality of bridges 213 arranged between the plurality of rotor cores 211 and the sleeve 212, and a permanent magnet accommodating unit 214 arranged between the plurality of rotor cores 211.

The plurality of rotor cores 211 may support a plurality of permanent magnets 230 described below and may form a path of a magnetic flux (or a magnetic path) generated from the plurality of permanent magnets 230. The plurality of rotor cores 211 may be arranged in the circumferential direction and may be arranged to be spaced apart from each other to form the permanent magnet accommodating unit 214 for accommodating the plurality of permanent magnets 230. The plurality of rotor cores 211 according to an example may be formed to extend in the first direction X.

The sleeve 212 may be formed in an annular shape and may include a shaft hole 215 extending in the first direction X. The motor shaft 30 according to an example may be supported by being inserted into the shaft hole 215. As an example, the sleeve 212 may include a first sleeve 2121 arranged at an upper end portion of the plurality of rotor cores 211 and a second sleeve 2122 arranged at a lower end portion of the plurality of rotor cores 211. The first sleeve 2121 and the second sleeve 2122 may be arranged to be spaced apart from each other in the first direction X.

The plurality of bridges 213 may be arranged between the plurality of rotor cores 211 and the sleeve 212 to connect the sleeve 212 with each of the plurality of rotor cores 211. Each of the plurality of bridges 213 according to an example may be arranged in the circumferential direction to correspond to each of the plurality of rotor cores 211. As an example, the plurality of bridges 213 may include a plurality of first bridges 2131 arranged at an upper end portion of the plurality of rotor cores 211 and a plurality of second bridges 2132 arranged at a lower end portion of the plurality of rotor cores 211. The plurality of first bridges 2131 and the plurality of second bridges 2132 may be arranged to be spaced apart from each other in the first direction X.

As an example, the plurality of first bridges 2131 may be arranged between the plurality of rotor cores 211 and the first sleeve 2121. Also, the plurality of second bridges 2132 may be arranged between the plurality of rotor cores 211 and the second sleeve 2122. As the plurality of first bridges 2131 are arranged between the plurality of rotor cores 211 and the first sleeve 2121, the plurality of rotor cores 211 and the first sleeve 2121 may be connected to each other. Also, as the plurality of second bridges 2132 are arranged between the plurality of rotor cores 211 and the second sleeve 2122, the plurality of rotor cores 211 and the second sleeve 2122 may be connected to each other.

According to an example, the plurality of rotor cores 211, the sleeve 212, and the plurality of bridges 213 may be integrally formed of the same material to implement the rotor body 210. As an example, the rotor body 210 may be formed by stacking body plates 2101, 2102, and 2103 in multiple layers in the first direction X. The body plates 2101, 2102, and 2103 according to an example may be formed from a planar base substrate (not illustrated) through a press punching process.

As an example, the first body plates 2101 and 2102 arranged at the upper and lower end portions of the rotor body 210 may include a plurality of planar rotor cores 2111 and 2112, sleeves 2121 and 2122, a plurality of bridges 2131 and 2132, and permanent magnet accommodating units 2141 and 2142. Also, the second body plate 2103 arranged between the upper and lower end portions of the rotor body 210 may include a plurality of rotor cores 2113 and a permanent magnet accommodating unit 2143.

Figure 14A:
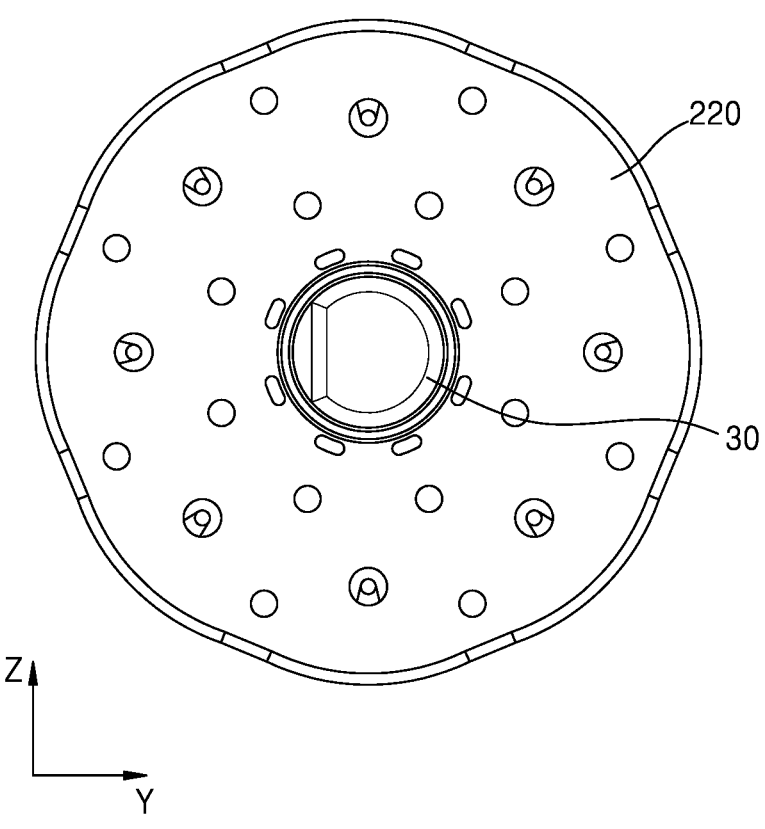
FIG. 14A is a plan view of a rotor before a hole is formed, according to an example.
Figure 14B:
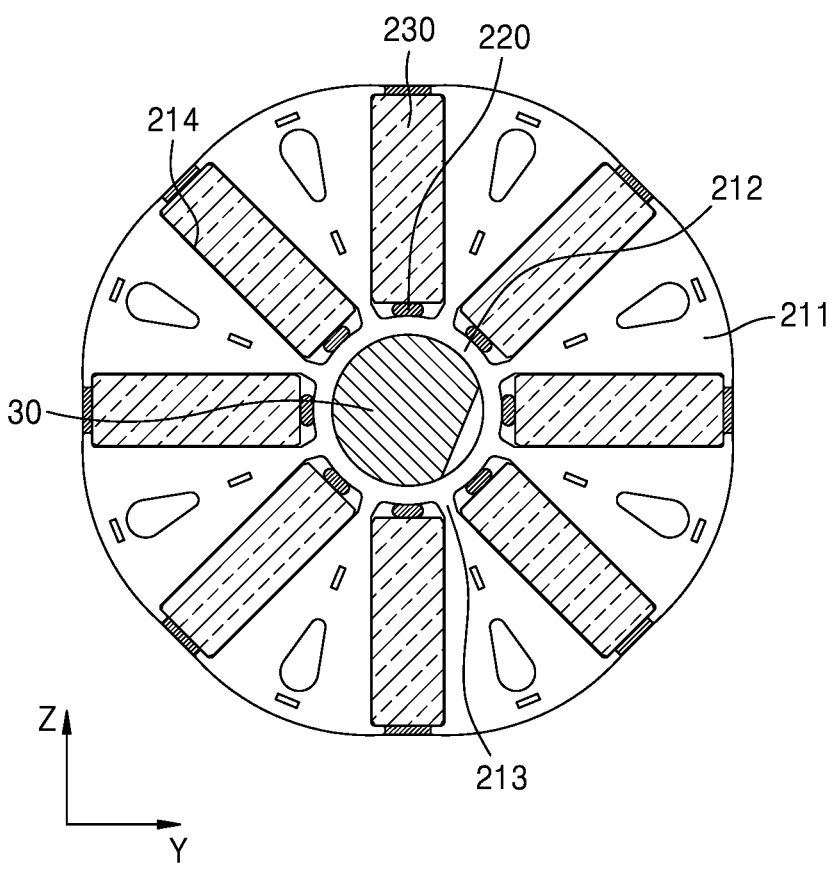
FIG. 14B is a cross-sectional view of the rotor illustrated in FIG. 14A.

FIG. 14A is a plan view of a rotor before a hole is formed, according to an example. FIG. 14B is a cross-sectional view of the rotor illustrated in FIG. 14A.

Referring to FIGS. 14A and 14B, the plurality of permanent magnets 230 according to an example may be arranged in the circumferential direction of the rotor 21 so as to be radially located around the motor shaft 30. As an example, the plurality of permanent magnets 230 may be arranged inside a plurality of rotor bodies 210. For example, the plurality of permanent magnets 230 may be separately arranged between the rotor cores 211 arranged adjacent to each other. In other words, the plurality of permanent magnets 230 may be separately arranged in the permanent magnet accommodating unit 214 formed between the plurality of rotor cores 211 arranged adjacent to each other.

A molding unit 220 may be arranged to cover the plurality of rotor cores 211, the area between the plurality of rotor cores 211 and the sleeve 212, and the plurality of permanent magnets 230 arranged in the permanent magnet accommodating unit 214. According to an example, the molding unit 220 may include an insulating material. Also, through an injection molding process, the molding unit 220 may be arranged to cover the plurality of rotor cores 211, the area between the plurality of rotor cores 211 and the sleeve 212, and the plurality of permanent magnets 230. Because other matters related to the plurality of permanent magnets 230 and the molding unit 220 are substantially the same as the plurality of permanent magnets 130 and the molding unit 120 illustrated in FIGS. 5A and 5B, redundant descriptions thereof will be omitted for conciseness.

Figure 15A:
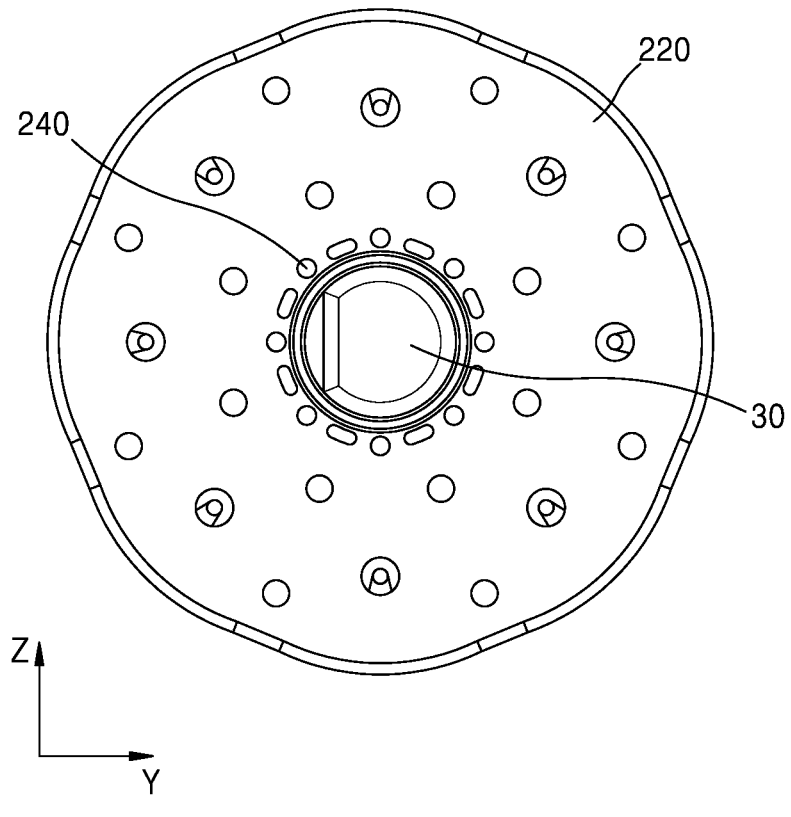
FIG. 15A is a plan view of a rotor according to an example.
Figure 15B:
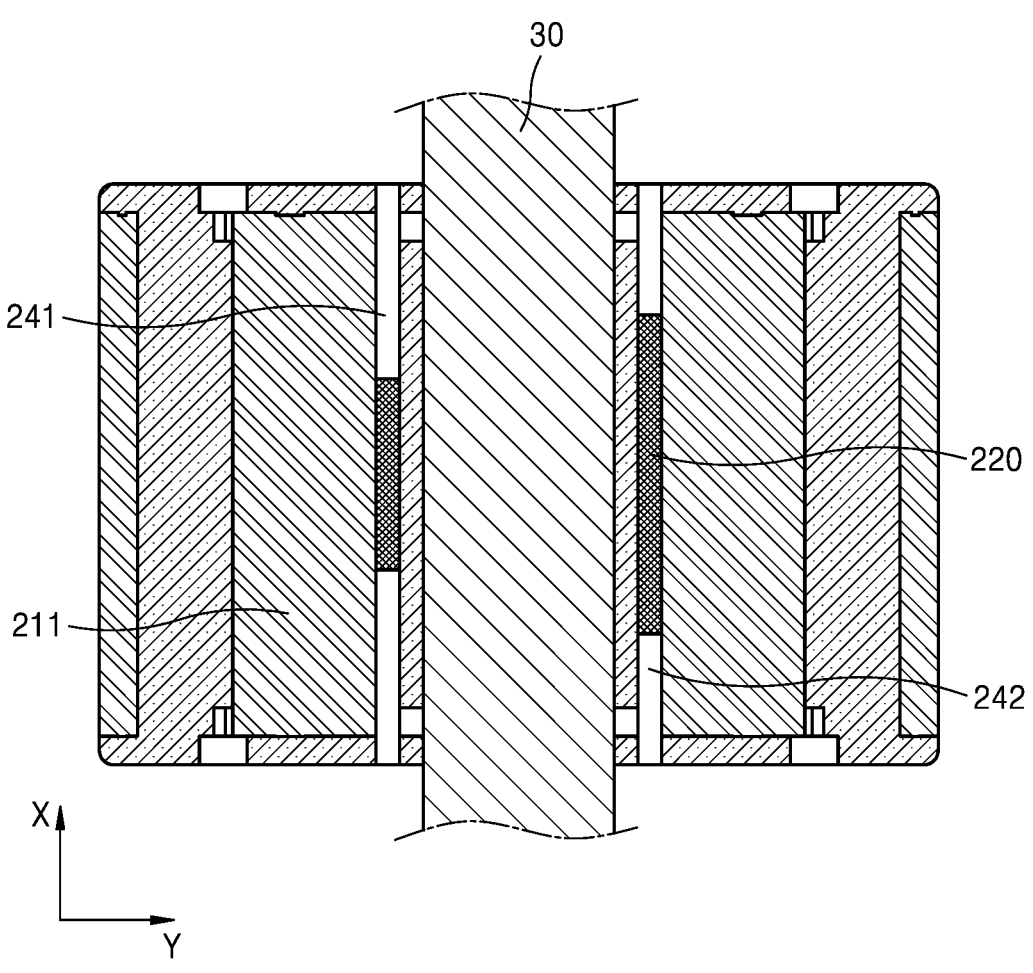
FIG. 15B is a cross-sectional view of the rotor illustrated in FIG. 15A.

FIG. 15A is a plan view of a rotor according to an example. FIG. 15B is a cross-sectional view of the rotor illustrated in FIG. 15A.

As illustrated in FIG. 6, the magnetic flux of the plurality of permanent magnets 230 may leak toward the motor shaft 30 through the sleeve 212 through the bridge 213. When a leakage magnetic flux is generated, because the usage of permanent magnets may increase for the motor of the same power, it may be disadvantageous in terms of manufacturing cost and miniaturization of the motor. Thus, an unnecessary leakage magnetic flux that may be generated from the plurality of permanent magnets 230 should be prevented.

As described above, the rotor body 210 according to an example may be formed by stacking body plates 2101, 2102, and 2103 in multiple layers in the first direction X. In this case, the leakage magnetic flux generated from the plurality of permanent magnets 230 may be transmitted to the motor shaft 30 through the plurality of rotor cores 211, the first and second sleeves 2121 and 2122, and the plurality of first and second bridges 2131 and 2132. When the flow of the path of the leakage magnetic flux through the plurality of rotor cores 211, the first and second sleeves 2121 and 2122, and the plurality of first and second bridges 2131 and 2132 is blocked, the flow of an unnecessary leakage magnetic flux may be blocked.

Referring to FIGS. 15A and 15B, a plurality of holes 240 according to an example may be respectively arranged in the plurality of bridges 213. As an example, a plurality of first holes 241 may be respectively arranged in bridges included in the plurality of first bridges 2131. Also, a plurality of second holes 242 may be respectively arranged in bridges included in the plurality of second bridges 2132. In this case, each of the plurality of first and second holes 241 and 242 may extend in the first direction X. Accordingly, the plurality of first bridges 2131 may be disconnected by the plurality of first holes 241 in the first direction X, and the plurality of second bridges 2132 may be disconnected by the plurality of second holes 242 in the first direction X. Accordingly, the path of the leakage magnetic flux through the plurality of rotor cores 211, the first and second sleeves 2121 and 2122, and the plurality of first and second bridges 2131 and 2132 may be blocked.

As described above, in order to block the path of the leakage magnetic flux, the plurality of first and second holes 241 and 242 may cut the plurality of first and second bridges 2131 and 2132. When the plurality of first and second holes 241 and 242 cut the plurality of first and second bridges 2131 and 2132, the connection between the first and second sleeves 2121 and 2122 and the plurality of rotor cores 211 may be blocked. According to an example, the molding unit 220 may be arranged between the plurality of permanent magnets 230 and the first and second sleeves 2121 and 2122 and between the plurality of first bridges 2131 and the plurality of second bridges 2132. In this case, the molding unit 220 may connect the plurality of permanent magnets 230 and the first and second sleeves 2121 and 2122 to each other. Accordingly, the plurality of permanent magnets 230 and the first and second sleeves 2121 and 2122 may be connected to each other such that power may be transmitted.

The plurality of first and second holes 241 and 242 according to an example may extend to the molding unit 220 to have a certain depth in the first direction X. In this case, the depths of the plurality of first and second holes 241 and 242 in the first direction X may be determined differently depending on the vibration situations of the rotor 21. As an example, when the vibration levels of the rotor 21 are different from each other in the area where the plurality of first holes 241 are arranged, two or more of the plurality of first holes 241 may be determined to have lengths equal to or different from each other in the first direction. Also, when the vibration levels of the rotor 21 are different from each other in the area where the plurality of second holes 242 are arranged, two or more of the plurality of second holes 242 may be determined to have lengths equal to or different from each other in the first direction. However, the disclosure is not limited thereto, and the number and arrangement positions of the plurality of first and second holes 241 and 242 and the depths of the plurality of first and second holes 241 and 242 may be adjusted differently depending on the vibration situations of the rotor 21.

Figure 16:
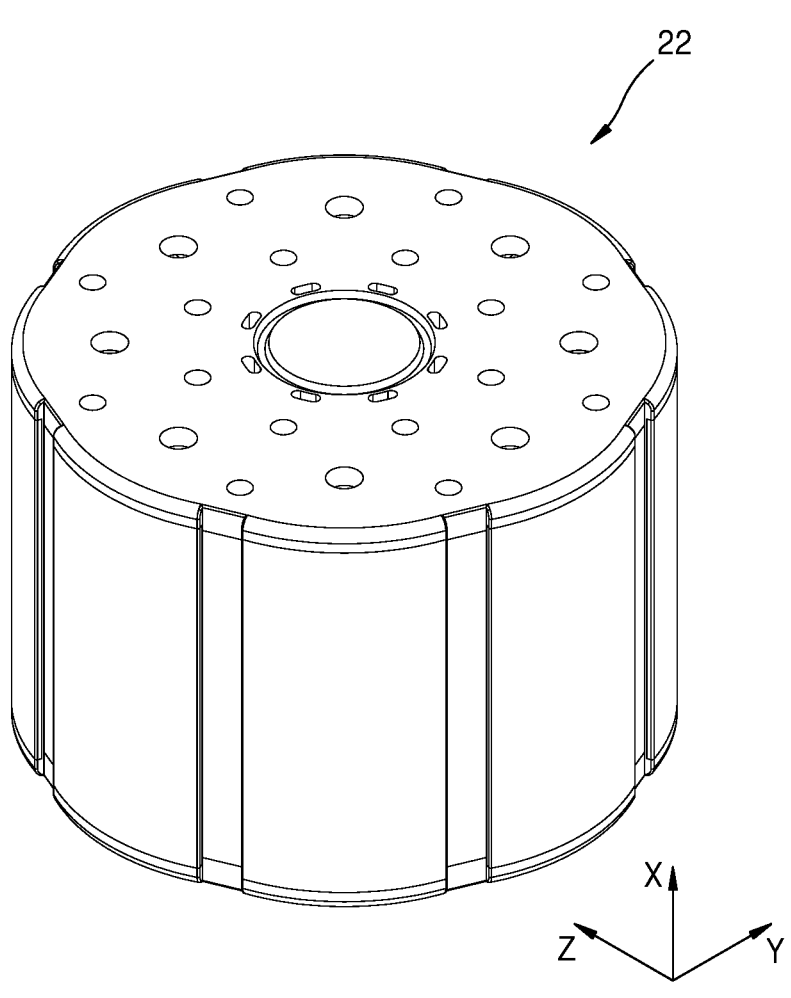
FIG. 16 is a perspective view of a rotor according to an example.
Figure 17:
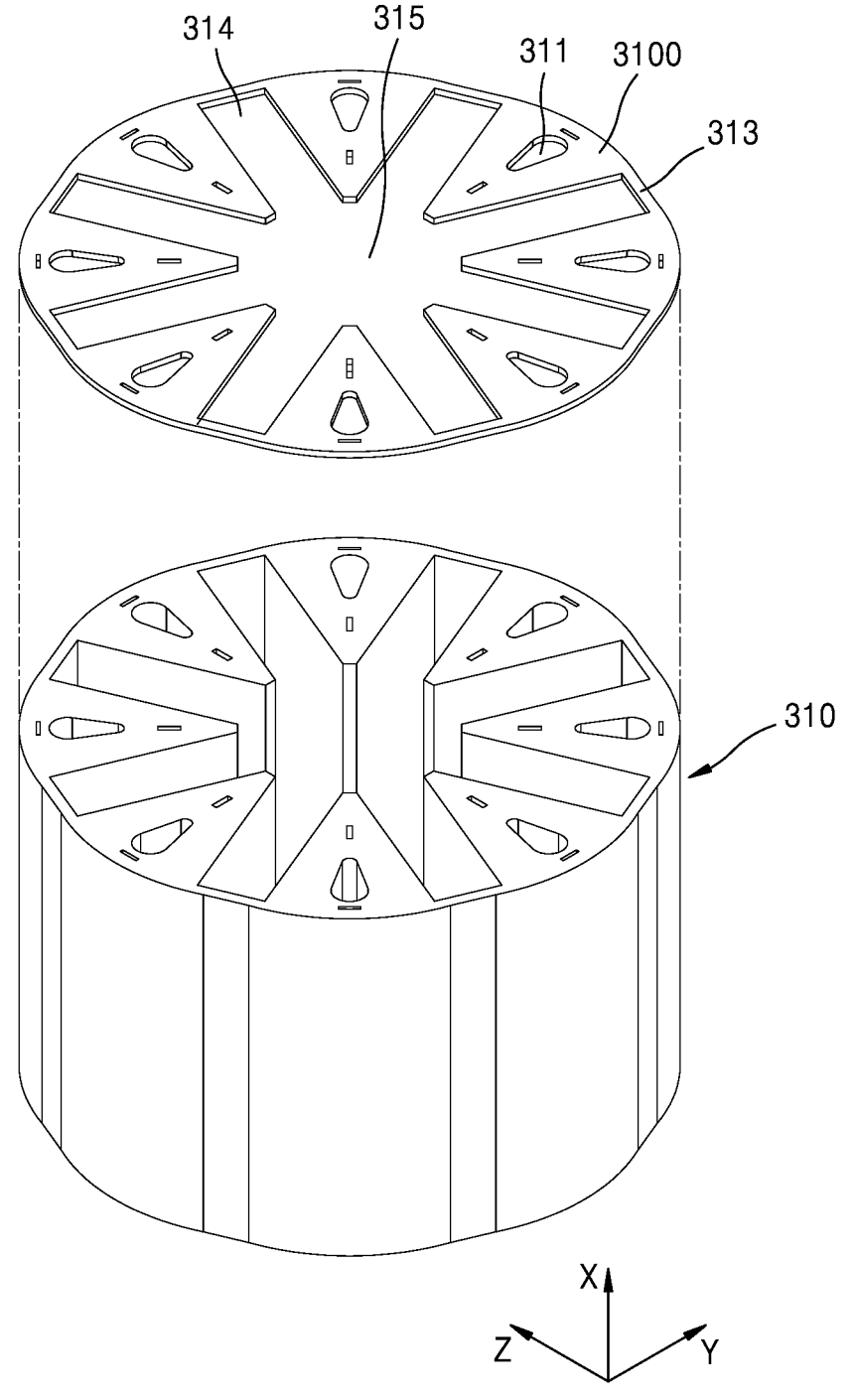
FIG. 17 is a perspective view of a rotor body according to an example.

FIG. 16 is a perspective view of a rotor according to an example. FIG. 17 is a perspective view of a rotor body according to an example.

Referring to FIGS. 1, 16, and 17, the motor M according to an example may include a stator 10, a rotor 22, and a motor shaft 30. The rotor 22 may be arranged in the rotor accommodating unit 12 to be rotatable with respect to the stator 10. Because the configurations of the stator 10 and the motor shaft 30, excluding the rotor 22, are the same as those illustrated in FIG. 1, redundant descriptions thereof will be omitted for conciseness.

A rotor body 310 according to an example may include a plurality of rotor cores 311, a plurality of bridges 313 arranged between the plurality of rotor cores 311 and a sleeve 312, and a permanent magnet accommodating unit 314 arranged between the plurality of rotor cores 311.

The plurality of rotor cores 311 may support a plurality of permanent magnets 330 described below and may form a path of a magnetic flux (or a magnetic path) generated from the plurality of permanent magnets 330. The plurality of rotor cores 311 may be arranged in the circumferential direction and may be arranged to be spaced apart from each other to form the permanent magnet accommodating unit 314 for accommodating the plurality of permanent magnets 330. The plurality of rotor cores 311 according to an example may be formed to extend in the first direction X.

The plurality of bridges 313 may be arranged between adjacent rotor cores 311 among the plurality of rotor cores 311 to connect the adjacent rotor cores 311 to each other. The plurality of bridges 313 according to an example may be arranged between the plurality of rotor cores 311 to be arranged in the circumferential direction.

According to an example, the plurality of rotor cores 311 and the plurality of bridges 313 may be integrally formed of the same material to implement the rotor body 310. As an example, the rotor body 310 may be formed by stacking a body plate 3100 in multiple layers in the first direction X. In this case, the body plate 3100 may include a planar rotor core 311 and a plurality of bridges 113.

The body plate 3100 according to an example may be formed from a planar base substrate (not illustrated) through a press punching process. For example, through a press punching process, the body plate 3100 may be processed into a ring shape integrally including the shapes of the rotor core 311 and the plurality of bridges 313. The rotor body 310 may be formed by stacking a plurality of body plates 3100 in multiple layers. However, the disclosure is not limited thereto, and the rotor body 310 may be formed in any mode including the plurality of rotor cores 311 and the plurality of bridges 313.

Figure 18A:
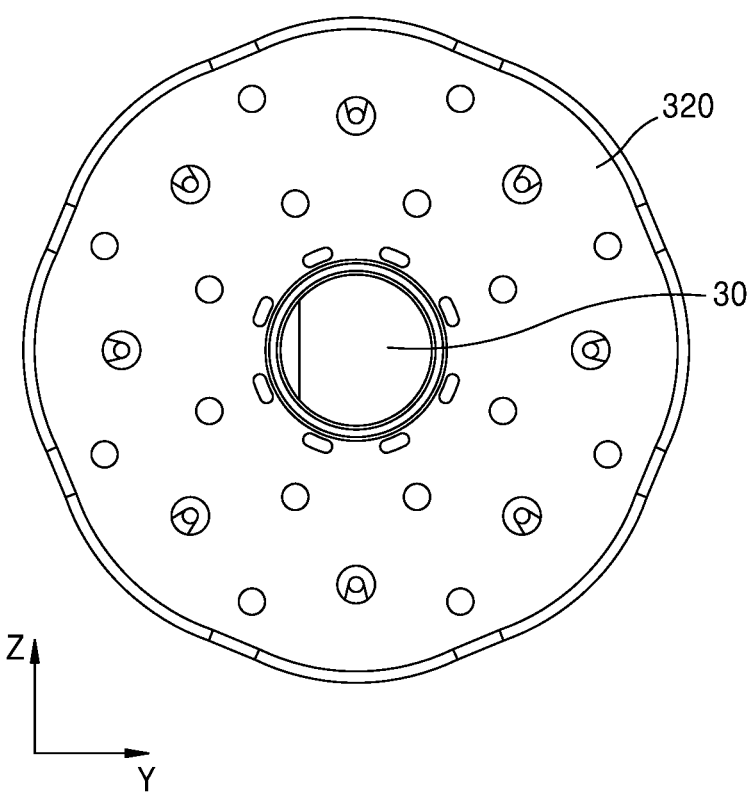
FIG. 18A is a plan view of a rotor before a hole is formed, according to an example.
Figure 18B:
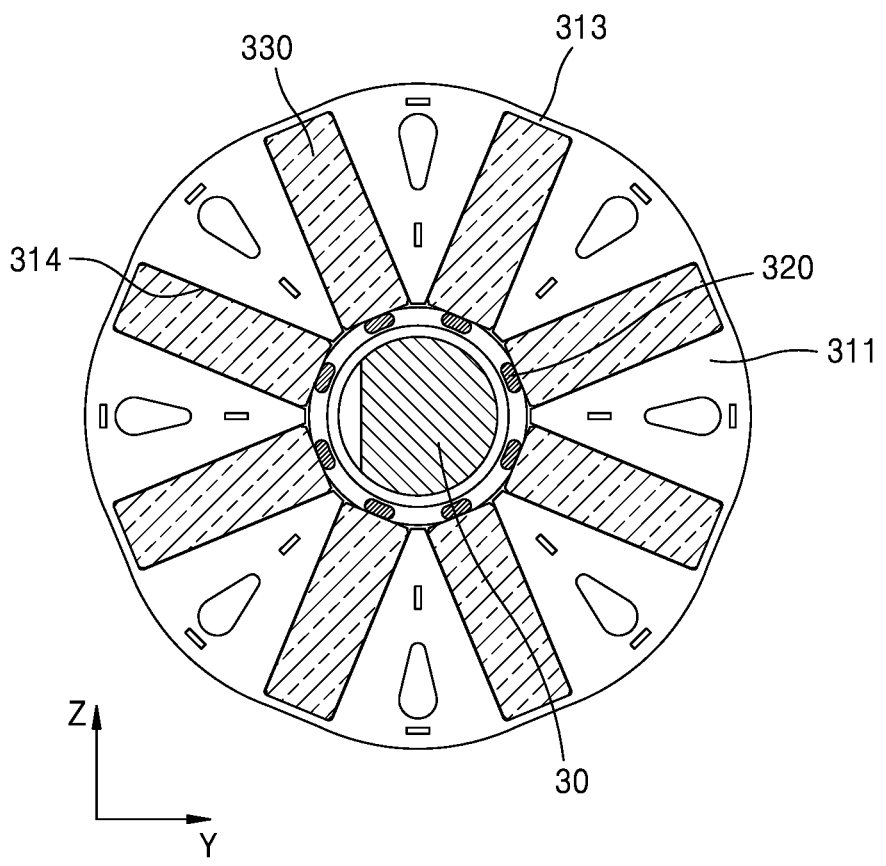
FIG. 18B is a cross-sectional view of the rotor illustrated in FIG. 18A.

FIG. 18A is a plan view of a rotor before a hole is formed, according to an example. FIG. 18B is a cross-sectional view of the rotor illustrated in FIG. 18A.

Referring to FIGS. 18A and 18B, the plurality of permanent magnets 330 according to an example may be arranged in the circumferential direction of the rotor 22 so as to be radially located around the motor shaft 30. As an example, the plurality of permanent magnets 330 may be arranged inside a plurality of rotor bodies 310. For example, the plurality of permanent magnets 330 may be separately arranged between the rotor cores 311 arranged adjacent to each other. In other words, the plurality of permanent magnets 330 may be separately arranged in the permanent magnet accommodating unit 314 formed between the plurality of rotor cores 311 arranged adjacent to each other.

A molding unit 320 may be arranged to cover the area between the plurality of rotor cores 311 and the motor shaft 30 and the plurality of permanent magnets 330 arranged in the permanent magnet accommodating unit 314. According to an example, the molding unit 320 may include an insulating material. Also, through an injection molding process, the molding unit 320 may be arranged to cover the area between the plurality of rotor cores 311 and the motor shaft 30 and the plurality of permanent magnets 330. Because other matters related to the plurality of permanent magnets 330 and the molding unit 320 are substantially the same as the plurality of permanent magnets 130 and the molding unit 120 illustrated in FIGS. 5A and 5B, redundant descriptions thereof will be omitted for conciseness.

Figure 19A:
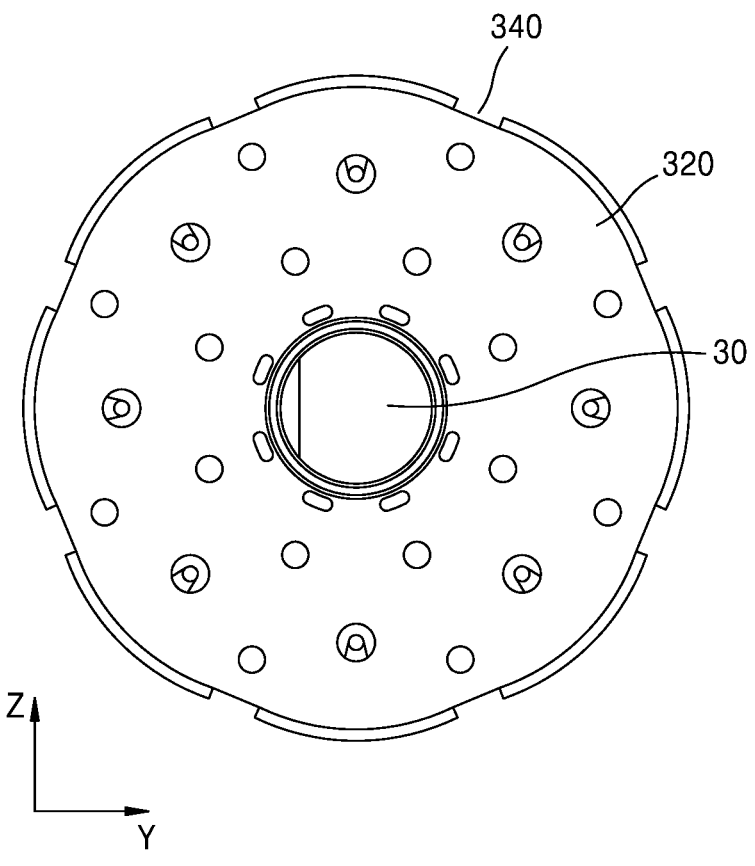
FIG. 19A is a plan view of a rotor according to an example.
Figure 19B:
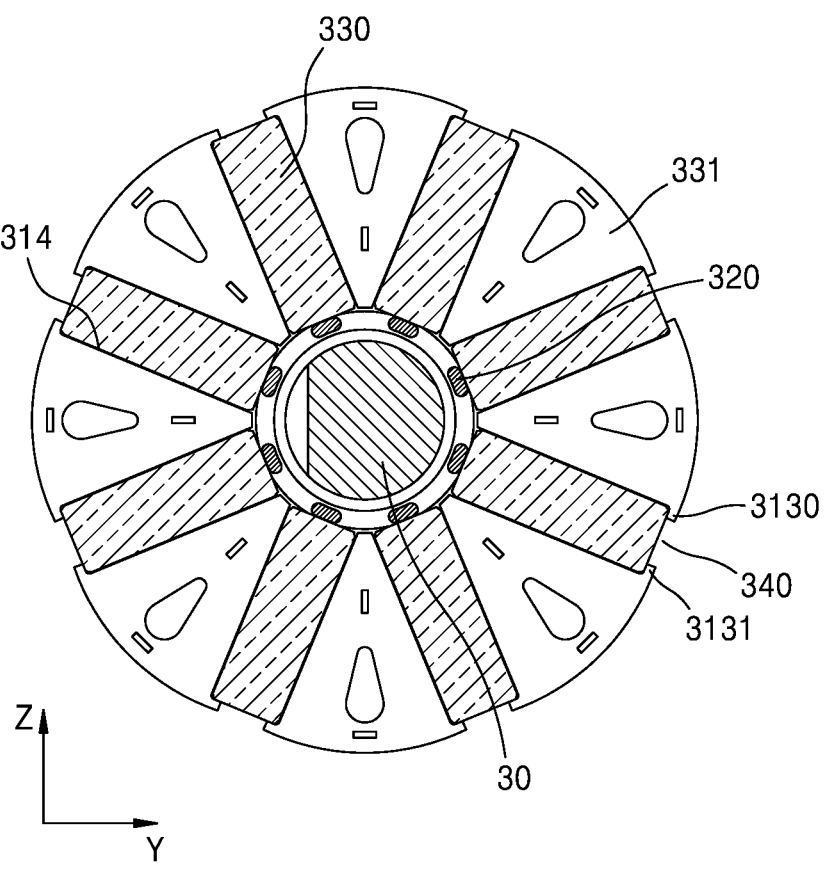
FIG. 19B is a cross-sectional view of the rotor illustrated in FIG. 19A.

FIG. 19A is a plan view of a rotor according to an example. FIG. 19B is a cross-sectional view of the rotor illustrated in FIG. 19A.

Referring to FIGS. 19A and 19B, a plurality of holes 340 according to an example may be respectively arranged in the plurality of bridges 313. As an example, each of the plurality of holes 340 may be arranged between a first end portion 3130 and a second end portion 3131 of the bridge 313. In this case, each of the plurality of holes 340 may extend in the first direction X. Accordingly, the connection between the first end portion 3130 and the second end portion 3131 of the bridge 313 may be blocked by each of the plurality of holes 340 in the first direction X.

According to an example, the molding unit 320 may be arranged between the plurality of permanent magnets 330 and the motor shaft 30. In this case, the molding unit 320 may connect the plurality of permanent magnets 330 and the motor shaft 30 to each other. Accordingly, the plurality of permanent magnets 330 and the motor shaft 30 may be connected to each other such that power may be transmitted.

Figure 20:
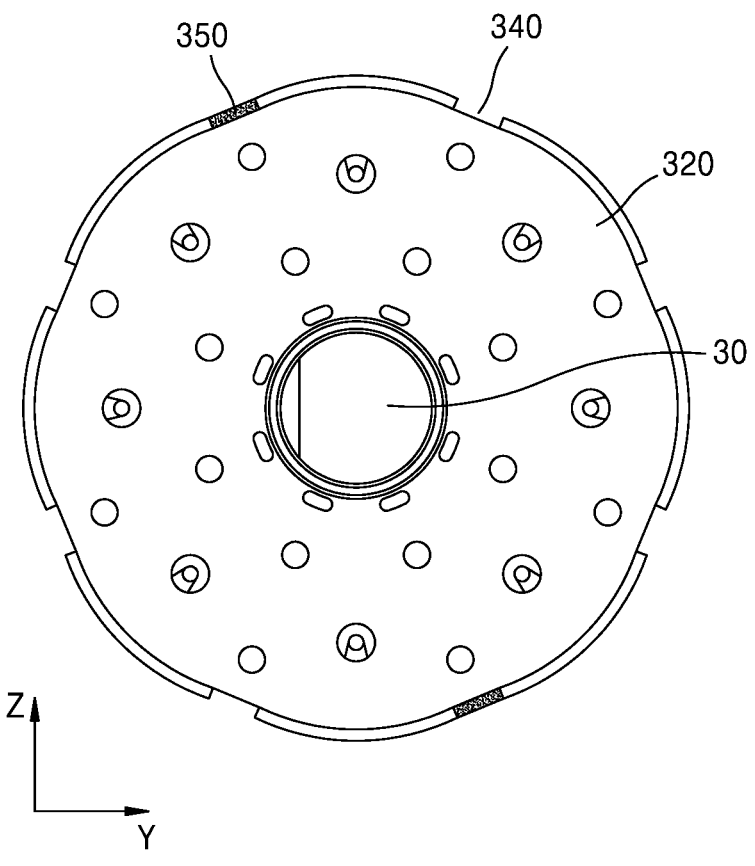
FIG. 20 is a plan view of a rotor according to an example.
Figure 21:
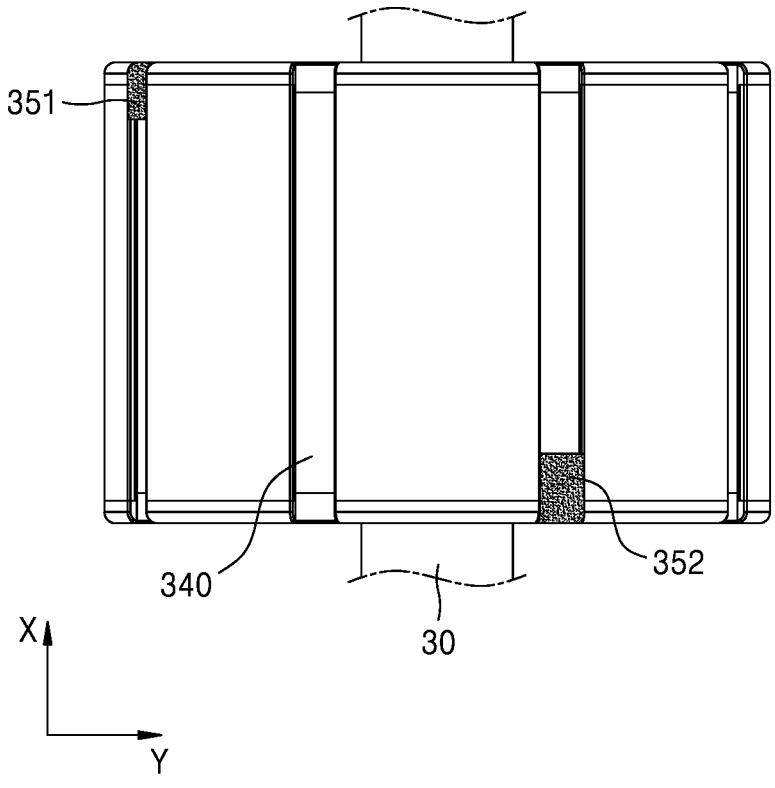
FIG. 21 is a side view of a rotor according to an example.

FIG. 20 is a plan view of a rotor according to an example. FIG. 21 is a side view of a rotor according to an example.

The rotor 22 according to an example may rotate around the first direction X. In this case, a vibration may occur during the rotation of the rotor 22 depending on the shape of the rotor 22 and the mass difference between separate areas of the rotor 22. In order to prevent a vibration from occurring in the rotor 22, an additional mass may be arranged in a separate area of the rotor 22.

Referring to FIGS. 20 and 21, one or more balance members 350 according to an example may be arranged in one or more of the plurality of holes 340. As an example, one or more balance members 350 may extend in the first direction X. For example, one or more balance members 350 may be implemented in plurality. In this case, two or more of a plurality of balance members 350 may have lengths equal to or different from each other in the first direction X.

Also, one or more balance members 350 according to an example may have a diameter less than the diameter of the plurality of holes 340. Accordingly, one or more balance members 350 may be arranged to be inserted into the plurality of holes 340.

Also, one or more balance members 350 according to an example may include an insulating material. Accordingly, an unnecessary leakage magnetic flux may be prevented from being transmitted through one or more balance members 350.

The length and arrangement position of one or more balance members 350 according to an example may be determined differently depending on the vibration situations of the rotor 22. As an example, when the vibration of the rotor 22 is sensed, a first balance member 351 and a second balance member 352 may be respectively arranged in two of the plurality of holes 340. In this case, depending on the vibration states of the rotor 22, the lengths of the first balance member 351 and the second balance member 352 in the first direction X may be adjusted differently as illustrated in FIG. 21.

However, the disclosure is not limited thereto, and the number of holes 340, the number and arrangement position of one or more balance members 350, and the length of one or more balance members 350 may be adjusted differently depending on the vibration situations of the rotor 22.

Figure 22:
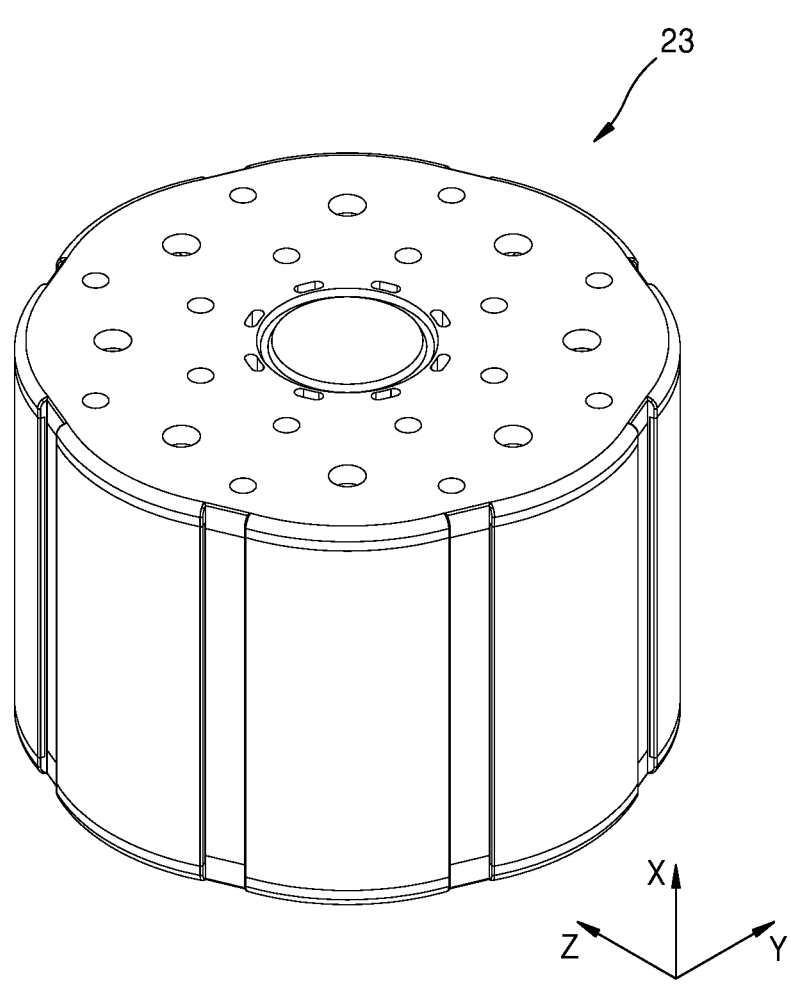
FIG. 22 is a perspective view of a rotor according to an example.
Figure 23:
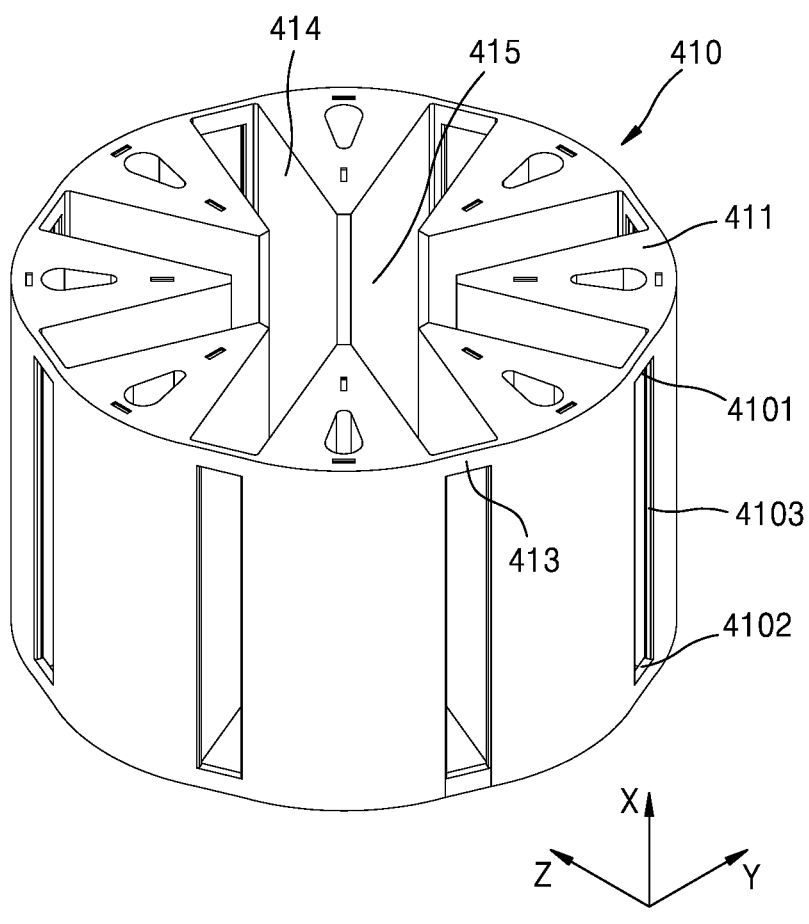
FIG. 23 is a perspective view of a rotor body according to an example.
Figure 24A:
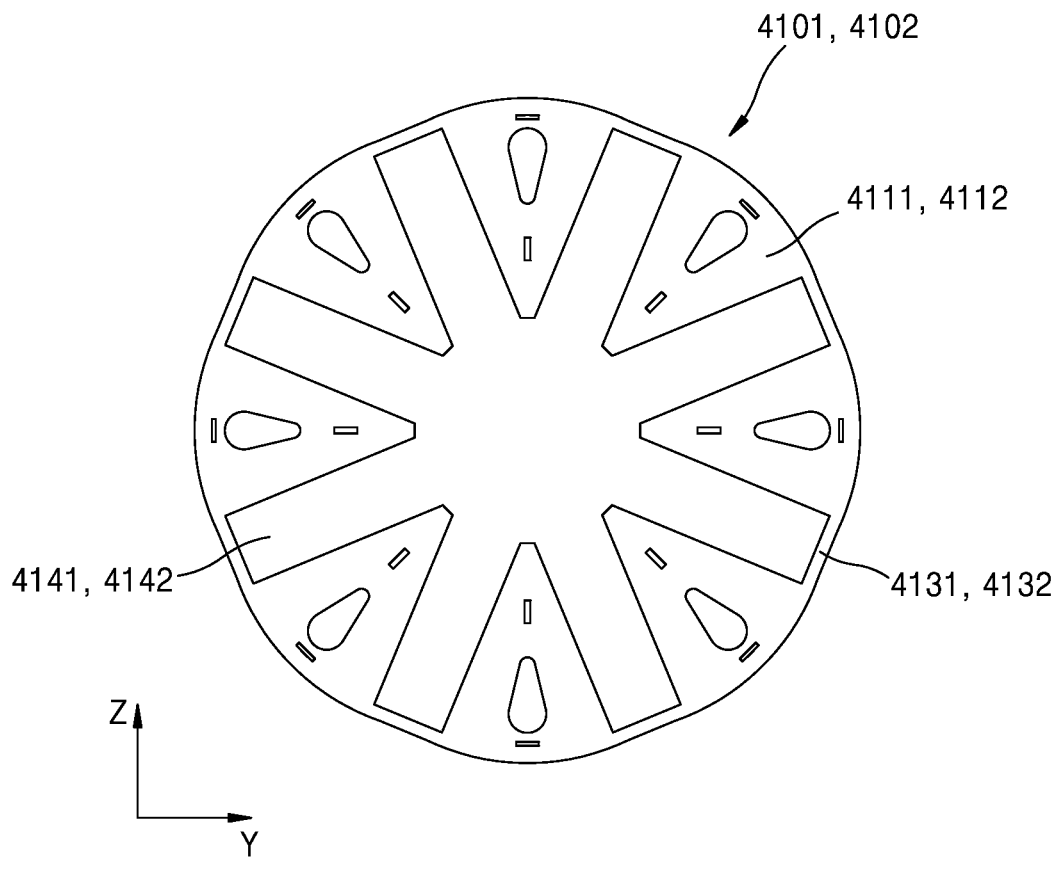
FIG. 24A is a plan view of a first body plate according to an example.
Figure 24B:
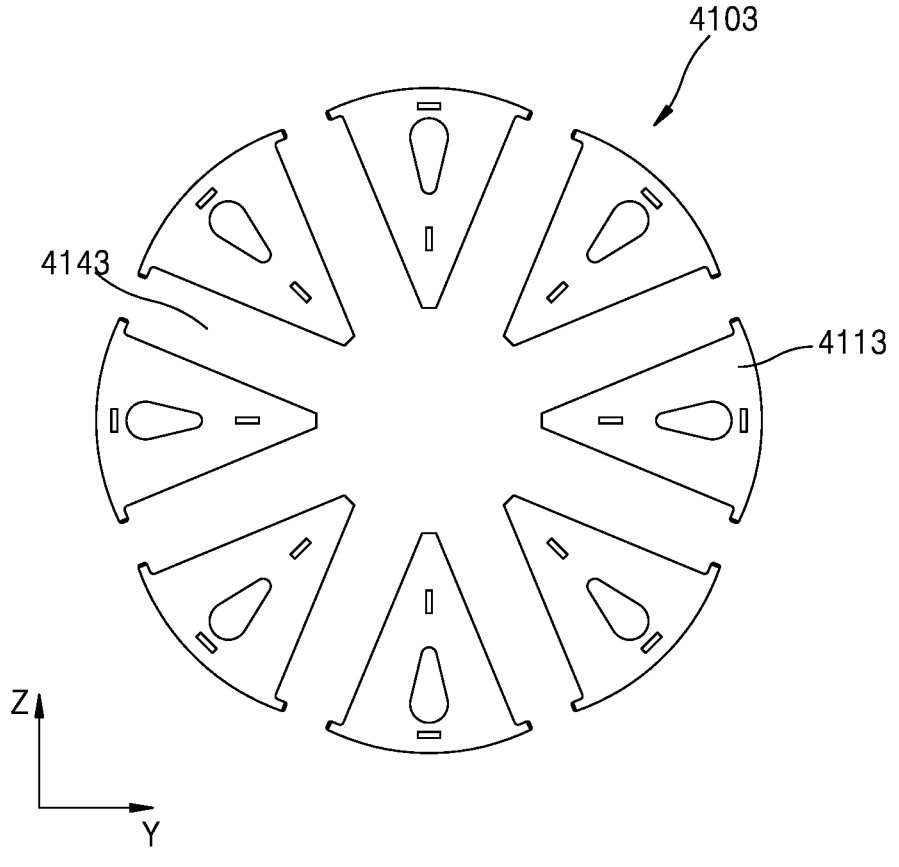
FIG. 24B is a plan view of a second body plate according to an example.

FIG. 22 is a perspective view of a rotor according to an example. FIG. 23 is a perspective view of a rotor body according to an example. FIG. 24A is a plan view of a first body plate according to an example. FIG. 24B is a plan view of a second body plate according to an example.

Referring to FIGS. 1, 22, and 23, the motor M according to an example may include a stator 10, a rotor 23, and a motor shaft 30. The rotor 23 may be arranged in the rotor accommodating unit 12 to be rotatable with respect to the stator 10. Because the configurations of the stator 10 and the motor shaft 30, excluding the rotor 23, are the same as those illustrated in FIG. 1, redundant descriptions thereof will be omitted for conciseness.

A rotor body 410 according to an example may include a plurality of rotor cores 411, a plurality of bridges 413 arranged between the plurality of rotor cores 411, and a permanent magnet accommodating unit 414 arranged between the plurality of rotor cores 411.

The plurality of rotor cores 411 may support a plurality of permanent magnets 430 described below and may form a path of a magnetic flux (or a magnetic path) generated from the plurality of permanent magnets 430. The plurality of rotor cores 411 may be arranged in the circumferential direction and may be arranged to be spaced apart from each other to form the permanent magnet accommodating unit 414 for accommodating the plurality of permanent magnets 430. The plurality of rotor cores 411 according to an example may be formed to extend in the first direction X.

The plurality of bridges 413 may be arranged between adjacent rotor cores 411 to connect the adjacent rotor cores 411 to each other. As an example, the plurality of bridges 413 may include a plurality of first bridges 4131 arranged at an upper end portion of the plurality of rotor cores 411 and a plurality of second bridges 4132 arranged at a lower end portion of the plurality of rotor cores 411. The plurality of first bridges 4131 and the plurality of second bridges 4132 may be arranged to be spaced apart from each other in the first direction X. As an example, as the plurality of first bridges 4131 and the plurality of second bridges 4132 are arranged between the plurality of rotor cores 411, the plurality of rotor cores 211 may be connected to each other.

According to an example, the plurality of rotor cores 411 and the plurality of bridges 413 may be integrally formed of the same material to implement the rotor body 410. As an example, the rotor body 410 may be formed by stacking body plates 4101, 4102, and 4103 in multiple layers in the first direction X. The body plates 4101, 4102, and 4103 according to an example may be formed from a planar base substrate (not illustrated) through a press punching process.

As an example, the first body plates 4101 and 4102 arranged at the upper and lower end portions of the rotor body 410 may include a plurality of planar rotor cores 4111 and 4112, a plurality of bridges 4131 and 4132, and permanent magnet accommodating units 4141 and 4142. Also, the second body plate 4103 arranged between the upper and lower end portions of the rotor body 410 may include a plurality of rotor cores 4113 and a permanent magnet accommodating unit 4143.

Figure 25A:
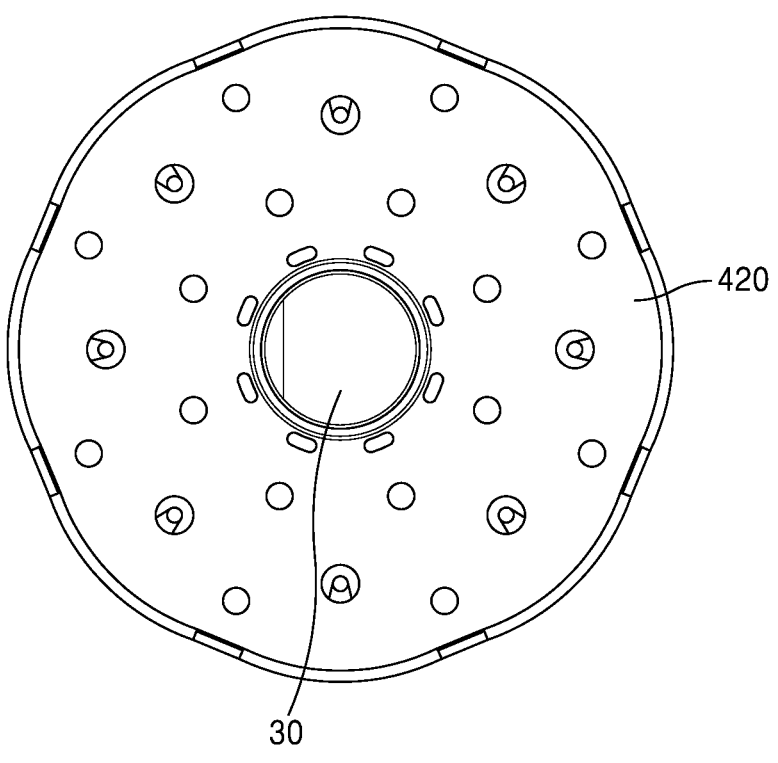
FIG. 25A is a plan view of a rotor before a hole is formed, according to an example.
Figure 25B:
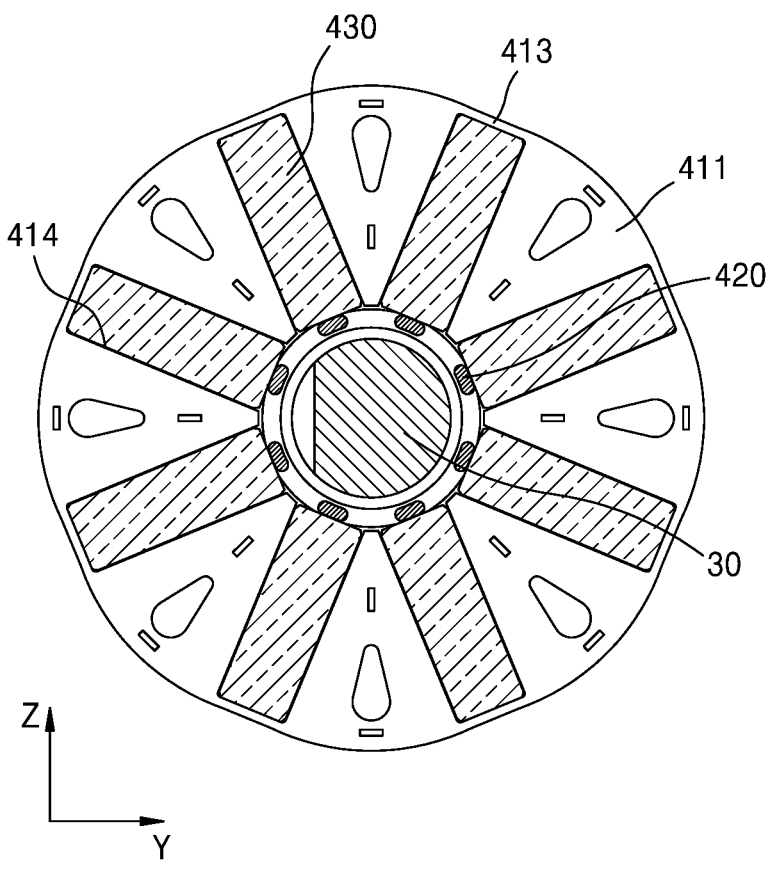
FIG. 25B is a cross-sectional view of the rotor illustrated in FIG. 25A.

FIG. 25A is a plan view of a rotor before a hole is formed, according to an example. FIG. 25B is a cross-sectional view of the rotor illustrated in FIG. 25A.

Referring to FIGS. 25A and 25B, the plurality of permanent magnets 430 according to an example may be arranged in the circumferential direction of the rotor 23 so as to be radially located around the motor shaft 30. As an example, the plurality of permanent magnets 430 may be arranged inside a plurality of rotor bodies 410. For example, the plurality of permanent magnets 430 may be separately arranged between the rotor cores 411 arranged adjacent to each other. In other words, the plurality of permanent magnets 430 may be separately arranged in the permanent magnet accommodating unit 414 formed between the plurality of rotor cores 411 arranged adjacent to each other.

A molding unit 420 may be arranged to cover the area between the motor shaft 30 and the plurality of rotor cores 411, the area between the plurality of first bridges 4131 and the plurality of second bridges 4132, and the plurality of permanent magnets 430 arranged in the permanent magnet accommodating unit 414. According to an example, the molding unit 420 may include an insulating material. Also, through an injection molding process, the molding unit 420 may be arranged to cover the area between the motor shaft 30 and the plurality of rotor cores 411, the area between the plurality of first bridges 4131 and the plurality of second bridges 4132, and the plurality of permanent magnets 430. According to an example, the molding unit 420 may connect the motor shaft 30 and the plurality of rotor cores 411 to each other. Accordingly, the motor shaft 30 and the plurality of rotor cores 411 may be connected to each other such that power may be transmitted.

Because other matters related to the plurality of permanent magnets 430 and the molding unit 420 are substantially the same as the plurality of permanent magnets 130 and the molding unit 120 illustrated in FIGS. 5A and 5B, redundant descriptions thereof will be omitted for conciseness.

Figure 26A:
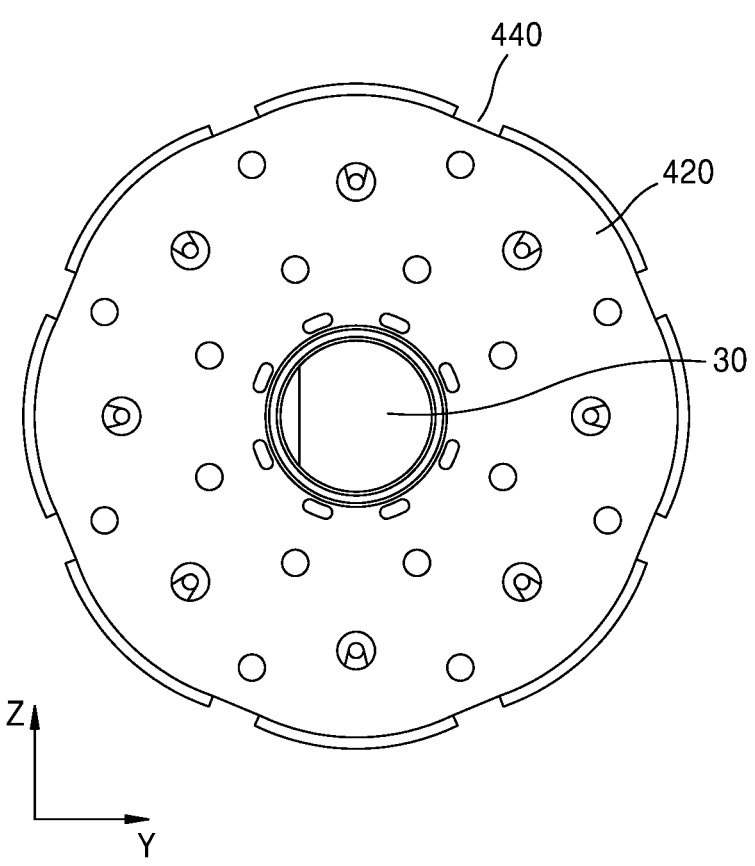
FIG. 26A is a plan view of a rotor according to an example.
Figure 26B:
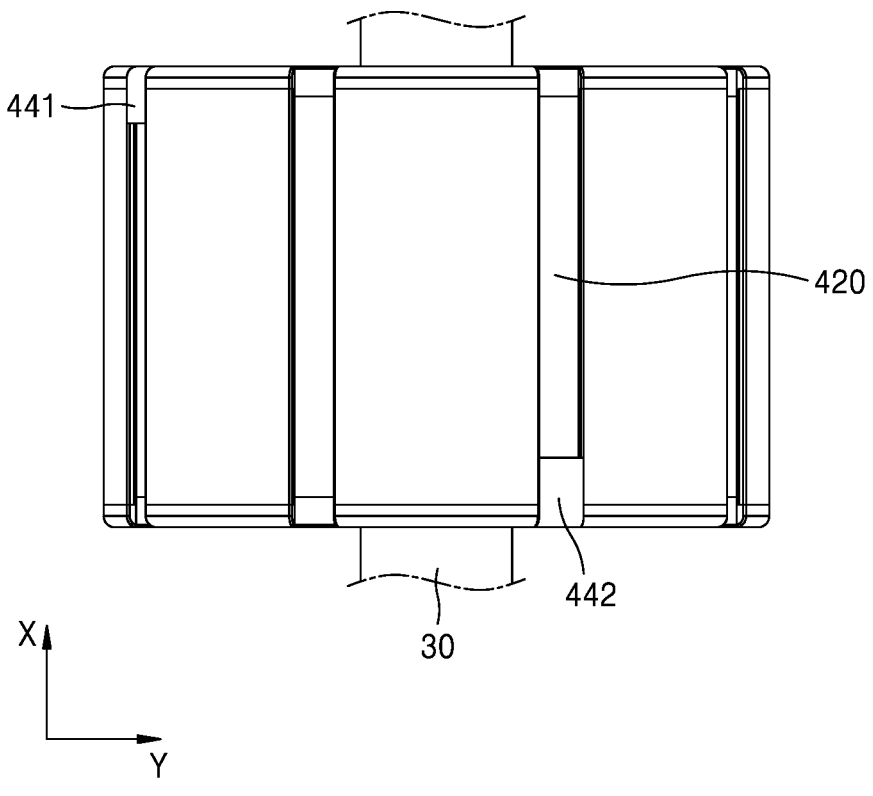
FIG. 26B is a side view of the rotor illustrated in FIG. 26A.

FIG. 26A is a plan view of a rotor according to an example. FIG. 26B is a side view of the rotor illustrated in FIG. 26A.

As described above, the rotor body 410 according to an example may be formed by stacking body plates 4101, 4102, and 4103 in multiple layers in the first direction X. Referring to FIGS. 26A and 26B, a plurality of holes 440 according to an example may be respectively arranged in the plurality of bridges 413. As an example, a plurality of first holes 441 may be respectively arranged in bridges included in the plurality of first bridges 4131. Also, a plurality of second holes 442 may be respectively arranged in bridges included in the plurality of second bridges 4132. In this case, each of the plurality of first and second holes 441 and 442 may extend in the first direction X. Accordingly, the plurality of first bridges 4131 may be disconnected by the plurality of first holes 441 in the first direction X, and the plurality of second bridges 4132 may be disconnected by the plurality of second holes 442 in the first direction X.

The plurality of first and second holes 441 and 442 according to an example may extend to the molding unit 420 to have a certain depth in the first direction X. In this case, the depths of the plurality of first and second holes 441 and 442 in the first direction X may be determined differently depending on the vibration situations of the rotor 23. As an example, when the vibration levels of the rotor 23 are different from each other in the area where the plurality of first holes 441 are arranged, two or more of the plurality of first holes 441 may be determined to have lengths equal to or different from each other in the first direction. Also, when the vibration levels of the rotor 23 are different from each other in the area where the plurality of second holes 442 are arranged, two or more of the plurality of second holes 442 may be determined to have lengths equal to or different from each other in the first direction. However, the disclosure is not limited thereto, and the number and arrangement positions of the plurality of first and second holes 441 and 442 and the depths of the plurality of first and second holes 441 and 442 may be adjusted differently depending on the vibration situations of the rotor 23.

A motor M according to an example may include a stator 10 including a plurality of stator cores 13 arranged to be spaced apart from each other by a certain distance in a circumferential direction and a coil 15 wound around each of the plurality of stator cores, and a rotor 20 arranged inside the plurality of stator cores, wherein the rotor may include a sleeve 112 including an axial hole extending in a first direction, a plurality of rotor cores 111 arranged to be spaced apart from each other in the circumferential direction, a plurality of permanent magnets 130 separately arranged between rotor cores arranged adjacent to each other, a plurality of bridges 113 each arranged to connect the sleeve with each of the plurality of rotor cores, a plurality of holes 140 each arranged in each of the plurality of bridges and arranged between both end portions of each bridge to block a connection between a first end portion and a second end portion of each bridge, and a molding unit 120 arranged between the sleeve and the plurality of rotor cores.

The plurality of rotor cores 111, the sleeve 112, and the plurality of bridges 113 may extend to have a certain thickness in the first direction, and the plurality of holes 140 respectively arranged in the plurality of bridges 113 may extend in the first direction.

The motor may further include one or more balance members 150 extending in the first direction and arranged in one or more of the plurality of holes.

Two or more of a plurality of balance members 150 may have lengths equal to or different from each other in the first direction.

The one or more balance members 150 may include an insulating material.

The plurality of rotor cores 211 may extend to have a certain thickness in the first direction, a first sleeve 2121 may be arranged at upper end portions of the plurality of rotor cores 211 and a second sleeve 2122 may be arranged at lower end portions of the plurality of rotor cores 211, a plurality of first bridges 2131 may be arranged between the upper end portions of the plurality of rotor cores and the first sleeve, a plurality of second bridges 2132 may be arranged between the lower end portions of the plurality of rotor cores and the second sleeve, a plurality of first holes 241 may be respectively arranged in bridges included in the plurality of first bridges, and a plurality of second holes 242 may be respectively arranged in bridges included in the plurality of second bridges.

The molding unit 220 may be arranged between the plurality of first bridges 2131 and the plurality of second bridges 2132 arranged to be spaced apart from each other in the first direction, each of the plurality of first holes 241 may extend to the molding unit 220 to have a certain depth in the first direction, and each of the plurality of second holes 242 may extend to the molding unit 220 to have a certain depth in the first direction.

Two or more of the plurality of first holes 241 may have lengths equal to or different from each other in the first direction, and two or more of the plurality of second holes 242 may have lengths equal to or different from each other in the first direction.

The molding unit 120 or 220 may include an insulating material.

A motor M according to an example may include a stator 10 including a plurality of stator cores 13 arranged to be spaced apart from each other by a certain distance in a circumferential direction and a coil 15 wound around each of the plurality of stator cores, and a rotor 22 arranged inside the plurality of stator cores, wherein the rotor may include a plurality of rotor cores 311 arranged to be spaced apart from each other in the circumferential direction, a plurality of permanent magnets 330 separately arranged between rotor cores arranged adjacent to each other, a plurality of bridges 313 arranged to connect between rotor cores arranged adjacent to each other among the plurality of rotor cores, and a plurality of holes 340 each arranged in each of the plurality of bridges and arranged between both end portions of each bridge to block a connection between a first end portion and a second end portion of each bridge.

The plurality of rotor cores 311 and the plurality of bridges 313 may extend to have a certain thickness in a first direction, and the plurality of holes 340 respectively arranged in the plurality of bridges may extend in the first direction.

The motor may further include one or more balance members 350 extending in the first direction and arranged in one or more of the plurality of holes.

Two or more of a plurality of balance members 350 may have lengths equal to or different from each other in the first direction.

The plurality of rotor cores 411 may extend to have a certain thickness in a first direction, a plurality of first bridges 4131 may be arranged between upper end portions of the plurality of rotor cores in the first direction, a plurality of second bridges 4132 may be arranged between lower end portions of the plurality of rotor cores in the first direction, a plurality of first holes 431 may be respectively arranged in bridges included in the plurality of first bridges, and a plurality of second holes 432 may be respectively arranged in bridges included in the plurality of second bridges.

The motor may further include a molding unit 420 arranged between the plurality of first bridges and the plurality of second bridges arranged to be spaced apart from each other in the first direction, wherein each of the plurality of first holes 431 may extend to the molding unit to have a certain depth in the first direction, and each of the plurality of second holes 432 may extend to the molding unit to have a certain depth in the first direction.

The above embodiments are merely examples, and those of ordinary skill in the art may derive various modifications and other equivalent embodiments therefrom. Thus, the true technical scope of the disclosure should be defined by the technical concept of the disclosure described in the following claims.

The invention claimed is:

1. A motor comprising:
a stator; and
a rotor surrounded in a circumferential direction of the rotor by the stator, wherein the rotor includes:
a sleeve including an axial hole extending in a first direction,
a plurality of rotor cores spaced apart from each other around the sleeve in the circumferential direction of the rotor,
a plurality of permanent magnets respectively arranged, between each two adjacent rotor cores of the plurality of rotor cores,
a plurality of bridges respectively corresponding to the plurality of rotor cores, wherein each bridge of the plurality of bridges is between the sleeve and a corresponding rotor core of the plurality of rotor cores,
each hole of a plurality of holes respectively corresponding to each bridge of the plurality of bridges, wherein each hole of the plurality of holes extends through a corresponding bridge of the plurality of bridges such that a connection between a first end portion and a second end portion of the corresponding bridge is blocked by each hole, and
a molding unit disposed between the sleeve and the plurality of rotor cores, wherein the molding unit connects the sleeve to the plurality of permanent magnets and the plurality of rotor cores.

2. The motor of claim 1, wherein
the plurality of rotor cores, the sleeve, and the plurality of bridges extend to have a certain thickness in the first direction, and
each hole of the plurality of holes extends in the first direction through the corresponding bridge of the plurality of bridges.

3. The motor of claim 2, further comprising one or more balance members extending in the first direction and disposed in one or more holes of the plurality of holes.

4. The motor of claim 3, wherein the one or more balance members includes at least two balance members and each balance member of the at least two balance members has a length extended in the first direction which is equal or different from each other.

5. The motor of claim 3, wherein each balance member of the one or more balance members includes an insulating material.

6. The motor of claim 1, wherein
the plurality of rotor cores extend to have a certain thickness in the first direction,
a first sleeve is arranged at upper end portions of the plurality of rotor cores and a second sleeve is arranged at lower end portions of the plurality of rotor cores,
a plurality of first bridges are arranged between the upper end portions of the plurality of rotor cores and the first sleeve,
a plurality of second bridges are arranged between the lower end portions of the plurality of rotor cores and the second sleeve,
a plurality of first holes respectively corresponding to the plurality of first bridges, wherein each hole of the plurality of first holes extends through the corresponding bridge of the plurality of first bridges, and
a plurality of second holes corresponding to the plurality of second bridges, wherein each hole of the plurality of second holes extends through the corresponding bridge of the plurality of second bridges.

7. The motor of claim 6, wherein
the molding unit is between the plurality of first bridges and the plurality of second bridges arranged to be spaced apart from each other in the first direction,
each first hole of the plurality of first holes extends through a corresponding first bridge of the plurality of first bridges to the molding unit so as to have a first depth in the first direction, and
each second hole of the plurality of second holes extends through a corresponding second bridge of the plurality of second bridges to the molding unit so as to have a second depth in the first direction.

8. The motor of claim 7, wherein
depths of two or more first holes of the plurality of first holes are equal or different from each other, and
depths of two or more second holes of the plurality of second holes are equal or different from each other.

9. The motor of claim 6, wherein the molding unit includes an insulating material.

10. A motor comprising:
a stator; and
a rotor surrounded in a circumferential direction of the rotor by the stator, wherein the rotor includes:
a sleeve including an axial hole extending in a first direction,
a plurality of rotor cores spaced apart in the circumferential direction of the rotor,
a plurality of permanent magnets respectively arranged, between each two adjacent rotor cores of the plurality of rotor cores,
a plurality of first bridges respectively corresponding to the plurality of rotor cores, wherein each first bridge of the plurality of first bridges is between the sleeve and a corresponding rotor core of the plurality of rotor cores,
each hole of a plurality of first holes respectively corresponding to each first bridge of the plurality of first bridges, wherein each first hole of the plurality of first holes extends through a corresponding first bridge of the plurality of first bridges such that a connection between a first end portion and a second end portion of the corresponding first bridge is blocked by each first hole,
a plurality of second bridges between each two adjacent rotor cores of the plurality of rotor cores,
each hole of a plurality of second holes respectively corresponding to each second bridge the plurality of second bridges, wherein each second hole of the plurality of second holes extends through a corresponding second bridge of the plurality of second bridges such that a connection between the first end portion and the second end portion of the corresponding second bridge is blocked by each second hole.

11. The motor of claim 10, wherein
the plurality of rotor cores and the plurality of second bridges extend to have a certain thickness in the first direction, and
each second hole of the plurality of second holes extends in the first direction through the corresponding second bridge of the plurality of second bridges.

12. The motor of claim 11, further comprising one or more balance members extending in the first direction and in one or more second holes of the plurality of second holes.

13. The motor of claim 12, wherein the one or more balance members includes at least two balance members and each balance member of the at least two balance members have a length extended in the first direction which is equal or different from each other.

14. The motor of claim 10, wherein the plurality of rotor cores extend to have a certain thickness in the first direction, a plurality of upper bridges is among the plurality of first bridges and the plurality of upper bridges are arranged between upper end portions of the plurality of rotor cores in the first direction, a plurality of lower bridges is among the plurality of first bridges and the plurality of lower bridges are arranged between lower end portions of the plurality of rotor cores in the first direction, a plurality of upper holes is among the plurality of first holes and each upper hole of the plurality of upper holes respectively corresponds to each upper bridge of the plurality of upper bridges, wherein each upper hole of the plurality of upper holes extends through a corresponding upper bridge of the plurality of upper bridges, and

a plurality of lower holes is among the plurality of first holes and each lower hole of the plurality of lower holes respectively corresponds to each lower bridge of the plurality of lower bridges, wherein each lower hole of the plurality of lower holes extends through a corresponding lower bridge of the plurality of lower bridges.

15. The motor of claim 14, further comprising:

a molding unit, wherein the plurality of upper bridges and the plurality of lower bridges are spaced apart from each other in the first direction, the molding unit is between the plurality of upper bridges and the plurality of lower bridges, each upper hole of the plurality of upper holes extends through each corresponding upper bridge of the plurality of upper bridges to the molding unit so as to have a first depth in the first direction, and each lower hole of the plurality of lower holes extends through each corresponding lower bridge of the plurality of lower bridges to the molding unit so as to have a second depth in the first direction.

* * * * *